US010917917B2

(12) United States Patent
Kazmi et al.

(10) Patent No.: US 10,917,917 B2
(45) Date of Patent: Feb. 9, 2021

(54) METHOD FOR TRANSMITTING RANDOM ACCESS MESSAGES ON NON-ANCHOR CARRIERS

(71) Applicant: TELEFONAKTIEBOLAGET LM ERICSSON (PUBL), Stockholm (SE)

(72) Inventors: Muhammad Kazmi, Sundbyberg (SE); Santhan Thangarasa, Vällingby (SE); Joakim Axmon, Limhamn (SE)

(73) Assignee: Telefonaktiebolaget Ericsson LM (publ), Stockholm (SE)

( * ) Notice: Subject to any disclaimer, the term of this patent is extended or adjusted under 35 U.S.C. 154(b) by 0 days.

(21) Appl. No.: 16/476,584

(22) PCT Filed: Jan. 24, 2018

(86) PCT No.: PCT/IB2018/050433
§ 371 (c)(1),
(2) Date: Jul. 9, 2019

(87) PCT Pub. No.: WO2018/142240
PCT Pub. Date: Aug. 9, 2018

(65) Prior Publication Data
US 2019/0364601 A1 Nov. 28, 2019

Related U.S. Application Data

(60) Provisional application No. 62/453,082, filed on Feb. 1, 2017.

(51) Int. Cl.
*H04W 74/08* (2009.01)
*H04W 16/26* (2009.01)
(Continued)

(52) U.S. Cl.
CPC ....... *H04W 74/0833* (2013.01); *H04W 16/26* (2013.01); *H04W 24/10* (2013.01); *H04W 52/245* (2013.01); *H04W 72/0473* (2013.01)

(58) Field of Classification Search
CPC ... H04W 24/10; H04W 16/26; H04W 52/245; H04W 72/0473; H04W 68/02; H04W 48/16; H04W 72/0453; H04B 17/318
See application file for complete search history.

(56) References Cited

U.S. PATENT DOCUMENTS 8,432,859 B2 * 4/2013 Lee .................. H04L 1/0072
370/329
9,185,706 B2 * 11/2015 Lindoff ............ H04W 72/0453
(Continued)

FOREIGN PATENT DOCUMENTS

GB 2552838 B * 8/2018 ............ H04W 68/02

OTHER PUBLICATIONS

Random Access Procedure on Non-Anchor PRB 3GPP TSG-RAN WG2 Meeting #95, R2-165209, p. 1-2 (Year: 2016).*
(Continued)

*Primary Examiner* — Ayaz R Sheikh
*Assistant Examiner* — Louis Samara
(74) *Attorney, Agent, or Firm* — Erjcsson Inc.

(57) ABSTRACT

A method in a User Equipment (UE) is provided. The method comprises: obtaining a request to transmit a random access message on a non-anchor carrier to a network node; determining a coverage enhancement (CE) level of the UE with respect to the non-anchor carrier based on a first procedure for the non-anchor carrier, the first procedure for the non-anchor carrier being based on a second procedure associated with an anchor carrier; determining radio resources associated with the determined CE level for transmitting the random access message; transmitting to the network node the random access message on the non-anchor carrier using the determined radio resources. A UE for performing this method is also provided.

19 Claims, 10 Drawing Sheets

(51) Int. Cl.
*H04W 24/10* (2009.01)
*H04W 52/24* (2009.01)
*H04W 72/04* (2009.01)

(56) References Cited

U.S. PATENT DOCUMENTS

| | | | |
|---|---|---|---|
| 2011/0142009 A1* | 6/2011 | Lindoff | H04L 5/0091 |
| | | | 370/332 |
| 2013/0010619 A1* | 1/2013 | Fong | H04W 72/0453 |
| | | | 370/252 |
| 2014/0254521 A1* | 9/2014 | Fong | H04W 72/042 |
| | | | 370/329 |
| 2015/0133115 A1* | 5/2015 | Jung | H04W 48/16 |
| | | | 455/434 |
| 2016/0227580 A1* | 8/2016 | Xiong | H04B 17/318 |

OTHER PUBLICATIONS

ISR and WO for PCT/IB2018/050433.

Ericsson (Rapforteur): 11 Email discussion report [95bis#27] [LTE/NB-IoT] Reduced power class 11 , 3GPP Draft; R2-168323 Email Discussion Report 95B1S 27 LTENB-IOT Reduced Power Class; 3rd Generation Partnership Project (3GPP), Mobile Competence Centre 650,Route Des Lucioles, vol. RAN WG2, No. Reno, US; Nov. 14, 2016-Nov. 18, 2016 Nov. 13, 2016.

Institute for Information Industry (III): Random access procedure on Non-anchor PRB11 3GPP Draft; R2-165209 Random Access Procedure on Non-Anchor PRB, 3rd Generation Partnership Project (3GPP), Mobile Competence Centre; 650, Route Des Lucioles; F-06921 Sophia-Antipolis Cedex ; France vol. RAN WG2, No. Goteborg; Aug. 22, 2016-Aug. 26, 2016 Aug. 13, 2016.

* cited by examiner

METHOD FOR TRANSMITTING RANDOM ACCESS MESSAGES ON NON-ANCHOR CARRIERS

RELATED APPLICATIONS

The present application claims the benefits of priority of U.S. Provisional Patent Application No. 62/453,082, entitled "Methods for selecting CE level for NPRACH on non-anchor carrier", and filed at the United States Patent and Trademark Office on Feb. 1, 2107, the content of which is incorporated herein by reference.

TECHNICAL FIELD

The present description generally relates to methods and network nodes for selecting Coverage Enhancement levels for NPRACH transmissions on non-anchor carriers.

BACKGROUND

Machine Type Communication (MTC)

The machine-to-machine (M2M) communication (or aka machine type communication (MTC)) is used for establishing a communication between machines and between machines and humans. The communication may comprise of exchange of data, signaling, measurement data, configuration information etc. The device size may vary from that of a wallet to that of a base station. The M2M devices are quite often used for applications like sensing environmental conditions (e.g. temperature reading), metering or measurement (e.g. electricity usage etc.), fault finding or error detection etc. In these applications, the M2M devices are active very seldom but over a consecutive duration depending upon the type of service e.g. about 200 ms once every 2 seconds, about 500 ms every 60 minutes etc. The M2M device may also do measurement on other frequencies or other RATs.

Narrow Band Internet of Things (NB-IOT)

The Narrow Band Internet of Things (NB-IOT) is a radio access for cellular internet of things (IOT), based to a great extent on a non-backward-compatible variant of E-UTRA, that addresses improved indoor coverage, support for a massive number of low throughput devices, low delay sensitivity, ultra-low device cost, low device power consumption and (optimized) network architecture.

The NB-IOT carrier BandWidth (Bw2) is 200 KHz. Examples of operating bandwidth (Bw1) of LTE are 1.4 MHz, 3 MHz, 5 MHz, 10 MHz, 15 MHz, 20 MHz etc.

NB-IoT Supports 3 Different Deployment Scenarios:

'Stand-alone operation' utilizing for example the spectrum currently being used by GERAN systems as a replacement of one or more GSM carriers. In principle, it operates on any carrier frequency which is neither within the carrier of another system nor within the guard band of another system's operating carrier. The other system can be another NB-IOT operation or any other RAT e.g. LTE.

'Guard band operation' utilizing the unused resource blocks within a LTE carrier's guard-band. The term guard band may also interchangeably be called as guard bandwidth. As an example, in case of LTE BandWidth (BW) of 20 MHz (i.e. Bw1=20 MHz or 100 RBs), the guard band operation of NB-IOT can place anywhere outside the central 18 MHz but within 20 MHz LTE BW.

'In-band operation' utilizing resource blocks within a normal LTE carrier. The in-band operation may also interchangeably be called in-bandwidth operation. More generally the operation of one RAT within the BW of another RAT is also called as in-band operation. As an example, in a LTE BW of 50 RBs (i.e. Bw1=10 MHz or 50 RBs), NB-IOT operation over one resource block (RB) within the 50 RBs is called in-band operation.

In NB-IOT, the downlink transmission is based on OFDM with 15 kHz subcarrier spacing and same symbol and cyclic prefix durations as for legacy LTE for all the scenarios: standalone, guard-band, and in-band. For UL transmissions, both multi-tone transmissions based on a 15 kHz subcarrier spacing on SC-FDMA, and single tone transmission, with either 3.75 kHz or 15 kHz subcarrier spacing, is supported.

Anchor Carrier and Non-Anchor Carrier in NB-IoT

In NB-IoT, anchor and non-anchor carriers are defined. In anchor carrier, the UE assumes that NPSS/NSSS/NPBCH/SIB-NB are transmitted on downlink. In non-anchor carrier, the UE does not assume that NPSS/NSSS/NPBCH/SIB-NB are transmitted on downlink. It should be noted that N refers to "narrowband" in the acronyms "NPSS/NSSS/NPBCH", which are defined at the end of this disclosure without the "N".

The anchor carrier is transmitted on subframes #0, #4, #5 in every frame and subframe #9 in every other frame. The anchor carriers transmitting NPBCH/SIB-NB contains also NRS. The non-anchor carrier contains NRS and UE specific signals such as NPDCCH and NPDSCH. The non-anchor carrier can be transmitted in any subframe other than those containing the anchor carrier. The resources for non-anchor carrier are configured by the network node. For example, the eNB signals a bitmap of DL subframes using Information Element (IE) (DL-Bitmap-NB) which is configured as non-anchor carrier. The anchor carrier and/or non-anchor carrier may typically be operated by the same network node e.g. by the serving cell. But the anchor carrier and/or non-anchor carrier may also be operated by different network nodes. The configuration of the non-anchor carriers is signaled to the UE via RRC message as defined in TS 36.331 version 13.2.0 as described below.

CarrierConfigDedicated-NB

The IE CarrierConfigDedicated-NB is used to specify a non-anchor carrier in NB-IoT.

CarrierConfigDedicated-NB information elements

```
-- ASN1START
CarrierConfigDedicated-NB-r13 ::=        SEQUENCE {
    dl-CarrierConfig-r13         DL-CarrierConfigDedicated-NB-r13,
    ul-CarrierConfig-r13         UL-CarrierConfigDedicated-NB-r13
}
DL-CarrierConfigDedicated-NB-r13 ::=    SEQUENCE {
    dl-CarrierFreq-r13               CarrierFreq-NB-r13,
    downlinkBitmapNonAnchor-r13      CHOICE {
```

| CarrierConfigDedicated-NB information elements |
| --- |
| ```
        useNoBitmap-r13                       NULL,
        useAnchorBitmap-r13                   NULL,
        explicitBitmapConfiguration-r13       DL-Bitmap-NB-r13,
        spare                                 NULL
    }   OPTIONAL,   -- Need ON
dl-GapNonAnchor-r13                     CHOICE {
        useNoGap-r13                          NULL,
        useAnchorGapConfig-r13                NULL,
        explicitGapConfiguration-r13          DL-GapConfig-NB-r13
        spare                                 NULL
    }   OPTIONAL,   -- Need ON
inbandCarrierInfo-r13       SEQUENCE {
    samePCI-Indicator-r13           CHOICE {
        samePCI-r13                     SEQUENCE {
            indexToMidPRB-r13               INTEGER (-55..54)
        },
        differentPCI-r13                SEQUENCE {
            eutra-NumCRS-Ports-r13          ENUMERATED {same, four}
        }
    }                   OPTIONAL,      -- Cond anchor-guardband
    eutraControlRegionSize-r13      ENUMERATED {n1, n2, n3}
}                       OPTIONAL,      -- Cond non-anchor-inband
...
}
UL-CarrierConfigDedicated-NB-r13 ::=     SEQUENCE {
    ul-CarrierFreq-r13  CarrierFreq-NB-r13
    ...                                         OPTIONAL,   -- Need OP
}
``` |

DL-Bitmap-NB

The IE DL-Bitmap-NB is used to specify the set of NB-IoT downlink subframes for downlink transmission.

| DL-Bitmap-NB information element |
| --- |
| ```
-- ASN1START
DL-Bitmap-NB-r13 ::=    CHOICE {
    subframePattern10-r13       BIT STRING (SIZE (10)),
    subframePattern10-r13       BIT STRING (SIZE (40))
}
``` |

Random Access Transmission in NB-IoT

In Rel-14 NB-IoT, the random access can be transmitted by the UE on anchor carrier as well as on the non-anchor carrier. The PRACH for NB-IoT is called as NPRACH.

The random access procedure is used for one or more purposes e.g. initial access (for UEs in the RRC_IDLE state), accessing resources for initiating UE or network originated call, resynchronization of the UL, scheduling request, positioning etc.

The resources available for NPRACH transmission is provided to the UE in the NB-IoT system information blocks e.g. in system information block 2-NB (SIB2-NB) or in a dedicated channel via RRC. The resources consist of preamble sequences, a time/frequency resources, number of repetitions per NPRACH preamble transmission etc.

The UE can also perform both contention based or non-contention based random access. A non-contention based random access or contention free random access can be initiated by the network node e.g. eNodeB. The eNodeB initiates a non-contention based random access either by sending a message in a DL control channel such as NPDCCH or by indicating it in an RRC message. The eNodeB can also order the UE to perform a contention based random access.

SUMMARY

At least the following problems may be envisioned.

In NB-IoT, the UE in the RRC idle state is served by an anchor cell, i.e. it receives paging, system information etc., from the anchor carrier aka anchor cell, anchor node etc. In the idle state, the UE only performs radio measurements (e.g. NRSRP, NRSRQ, etc.) only on the anchor carrier. However, when the UE goes into the RRC connected state, the UE may be served by either an anchor carrier or by a non-anchor carrier. In the latter case, the UE can be redirected by the network node to move to one of the non-anchor carriers. In this case, the UE will be required to perform a random access to the non-anchor carrier. However due to lack of measurements on the non-anchor carrier, the redirection to the non-anchor carrier may fail. This in turn may lead to the wastage of the radio resources used for scheduling the UE on non-anchor carrier. For example, the UE may use the measurements performed on the anchor carrier to obtain the random access to the non-anchor carrier. However, the non-anchor carrier and the anchor carrier do not have the same properties, as such, the obtained random access may be inaccurate.

Certain aspects and their embodiments of the present disclosure may provide solutions to these or other problems.

According to a first aspect, there is provided a method in a User Equipment (UE). The method comprises: obtaining a request to transmit a random access message on a non-anchor carrier to a network node; determining a coverage enhancement (CE) level of the UE with respect to the non-anchor carrier based on a first procedure for the non-anchor carrier, the first procedure for the non-anchor carrier being based on a second procedure associated with an anchor carrier; determining radio resources associated with the determined CE level for transmitting the random access message, transmitting to the network node the random access message on the non-anchor carrier using the determined radio resources.

According to a second aspect, there is provided a User Equipment (UE). The UE comprises: a processing circuitry and a network interface connected thereto, the processing circuitry configured to: obtain a request to transmit a random access message on a non-anchor carrier to a network node; determine a coverage enhancement (CE) level of the UE with respect to the non-anchor carrier based on a first procedure for the non-anchor carrier, the first procedure for the non-anchor carrier being based on a second procedure associated with an anchor carrier; determine radio resources associated with the determined CE level for transmitting the random access message; transmit to the network node the random access message on the non-anchor carrier using the determined radio resources.

According to a third aspect, there is provided a method in a network node. The method comprises: receiving from a User Equipment (UE) a random access message on a non-anchor carrier; determining a coverage enhancement (CE) level of the UE with respect to the non-anchor carrier, based on the received message and based on a first procedure for the non-anchor carrier, the first procedure for the non-anchor carrier being based on a second procedure associated with an anchor carrier; using the determined coverage enhancement level for one or more operational tasks.

According to a fourth aspect, there is provided a network node comprising a processing circuitry and a network interface connected thereto. The processing circuitry is configured to: receive from a User Equipment (UE) a random access message on a non-anchor carrier; determine a coverage enhancement (CE) level of the UE with respect to the non-anchor carrier, based on the received message and based on a first procedure for the non-anchor carrier, the first procedure for the non-anchor carrier being based on a second procedure associated with an anchor carrier; use the determined coverage enhancement level for one or more operational tasks.

Certain embodiments of aspects of the present disclosure may provide one or more technical advantages, including:

The method enables the UE to adapt a procedure based on whether the random access is to be sent to an anchor or a non-anchor carrier. This in turn enhances the random access performance.

The UE behavior for sending random access is well defined. This in turn allows the network node to more accurately determine the coverage level of the UE in the cell.

The radio resources used for random access to anchor and non-anchor carriers are more efficiently utilized by the UE.

It is to be noted that any feature of any of the embodiments disclosed herein may be applied to any other embodiment, wherever appropriate. Likewise, any advantage of any of the embodiments may apply to the other embodiments, and vice versa. Certain embodiments may have some, or none of the above advantages. Other advantages will be apparent to persons of ordinary skill in the art. Other objectives, features and advantages of the enclosed embodiments will be apparent from the following description.

Generally, all terms used herein are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

This summary is not an extensive overview of all contemplated embodiments, and is not intended to identify key or critical aspects or features of any or all embodiments or to delineate the scope of any or all embodiments. In that sense, other aspects and features will become apparent to those ordinarily skilled in the art upon review of the following description of specific embodiments in conjunction with the accompanying figures.

BRIEF DESCRIPTION OF THE DRAWINGS

Exemplary embodiments will be described in more detail with reference to the following figures, in which.

DETAILED DESCRIPTION

Figure 1:
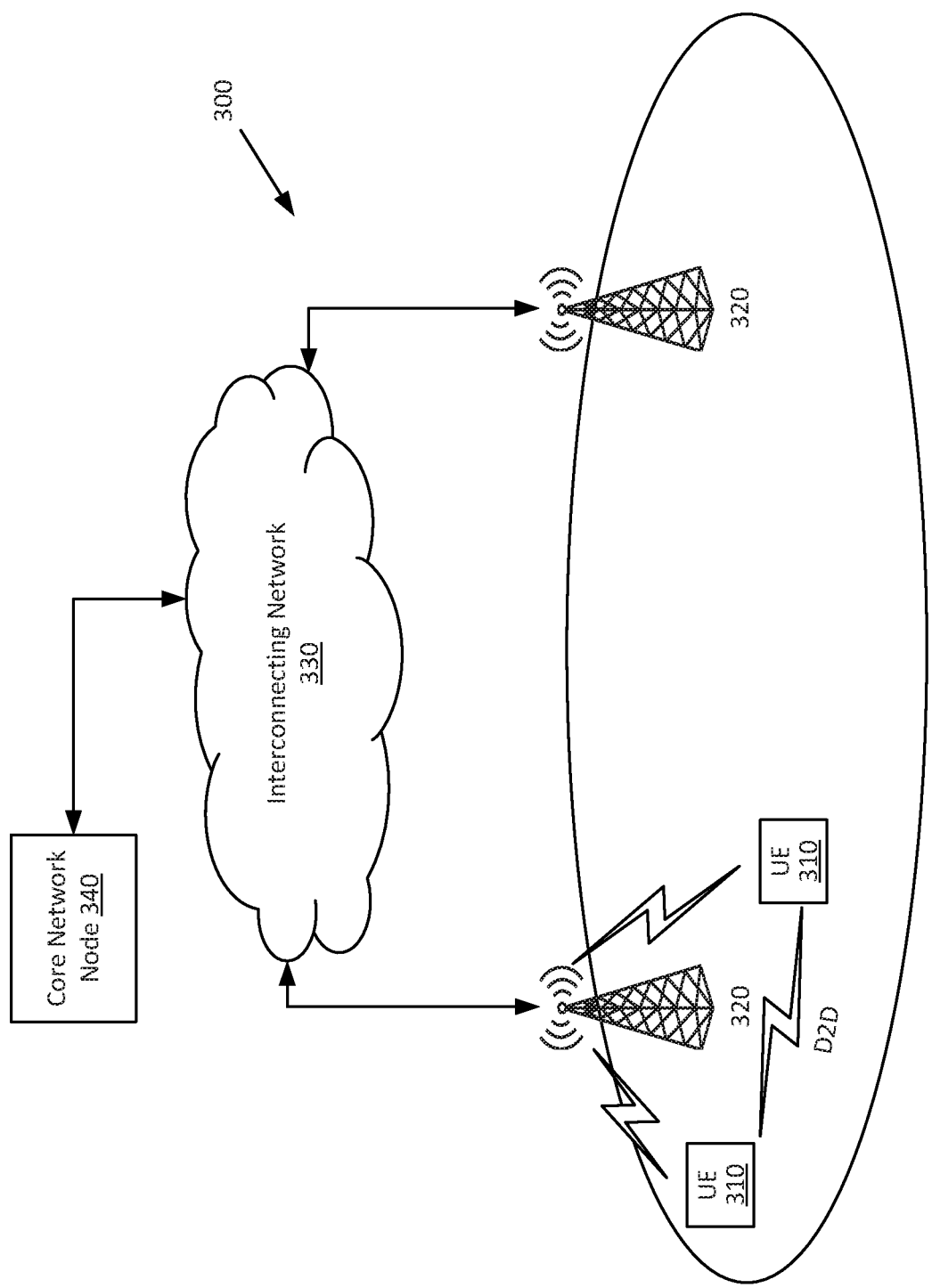
FIG. 1 illustrates a schematic diagram of a communication network.

The embodiments set forth below represent information to enable those skilled in the art to practice the embodiments. Upon reading the following description in light of the accompanying figures, those skilled in the art will understand the concepts of the description and will recognize applications of these concepts not particularly addressed herein. It should be understood that these concepts and applications fall within the scope of the description.

In the following description, numerous specific details are set forth. However, it is understood that embodiments may be practiced without these specific details. In other instances, well-known circuits, structures, and techniques have not been shown in detail in order not to obscure the understanding of the description. Those of ordinary skill in the art, with the included description, will be able to implement appropriate functionality without undue experimentation.

References in the specification to "one embodiment," "an embodiment," "an example embodiment," etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to implement such feature, structure, or characteristic in connection with other embodiments whether or not explicitly described.

As used herein, the singular forms "a", "an" and "the" are intended to include the plural forms as well, unless the context clearly indicates otherwise. It will be further understood that the terms "comprises," "comprising," "includes,"

and/or "including" when used herein, specify the presence of stated features, integers, steps, operations, elements, and/or components, but do not preclude the presence or addition of one or more other features, integers, steps, operations, elements, components, and/or groups thereof. Also, the use of terms such as "first" or "second" is for purposes of distinguishing one element from another element only. As such, a same element can be referred to as the first element or the second element in different embodiments in order to be distinguished from the other element.

Many aspects will be described in terms of sequences of actions or functions. It should be recognized that in some embodiments, some functions or actions could be performed by specialized circuits, by program instructions being executed by one or more processors, or by a combination of both.

Further, some embodiments can be partially or completely embodied in the form of computer readable carrier or carrier wave containing an appropriate set of computer instructions that would cause a processor to carry out the techniques described herein.

In some alternate embodiments, the functions/actions may occur out of the order noted in the sequence of actions. Furthermore, in some illustrations, some blocks, functions or actions may be optional and may or may not be executed, these are generally illustrated with dashed lines.

Embodiments of the present disclosure may be implemented in a wireless network such as the example wireless communication network illustrated in FIG. 1. However, the embodiments may be implemented in any appropriate type of system using any suitable components.

FIG. 1 illustrates an example of a wireless communication network 300 that may be used for wireless communications. Wireless communication network 300 includes wireless devices 310 (e.g., user equipments, UEs) and a plurality of network nodes 320 (e.g., eNBs, gNBs, base stations, etc.) connected to one or more core network nodes 340 via an interconnecting network 330. Wireless devices 310 within a coverage area may each be capable of communicating directly with network nodes 320 over a wireless interface. In certain embodiments, wireless devices 310 may also be capable of communicating with each other via device-to-device (D2D) communication. In certain embodiments, network nodes 320 may also be capable of communicating with each other, e.g. via an interface (e.g. X2 in LTE or other suitable interface).

As an example, wireless device 310 may communicate with network node 320 over a wireless interface. That is, wireless device 310 may transmit wireless signals and/or receive wireless signals from network node 320. The wireless signals may contain voice traffic, data traffic, control signals, and/or any other suitable information. In some embodiments, an area of wireless signal coverage associated with a network node 320 may be referred to as a cell.

In some embodiments wireless device 310 may be interchangeably referred to by the non-limiting term user equipment (UE). It refers to any type of wireless device communicating with a network node and/or with another UE in a cellular or mobile communication system. Examples of UE are target device, device to device (D2D) UE, machine type UE or UE capable of machine to machine (M2M) communication. PDA, tablet computer, mobile terminals, smart phone, laptop embedded equipped (LEE), laptop mounted equipment (LME), USB dongles, ProSe UE, V2V UE, V2X UE, MTC UE, eMTC UE, FeMTC UE, UE Cat 0, UE Cat M1, narrowband Internet of Things (NB-IoT) UE, UE Cat NB1, etc. Example embodiments of a wireless device 310 are described in more detail below with respect to FIGS. 4 and 7.

In some embodiments, the "network node" can correspond to any type of radio network node or any network node, which communicates with a UE and/or with another network node. Examples of network nodes are NodeB, MeNB, SeNB, a network node belonging to MCG or SCG, base station (BS), multi-standard radio (MSR) radio node such as MSR BS, eNodeB, gNodeB, network controller, radio network controller (RNC), base station controller (BSC), relay, donor node controlling relay, base transceiver station (BTS), access point (AP), transmission points, transmission nodes, RRU, RRH, nodes in distributed antenna system (DAS), core network node (e.g. MSC, MME, etc.), O&M, OSS, SON, positioning node (e.g. E-SMLC), MDT, test equipment, etc.

In certain embodiments, network nodes 320 may interface with a radio network controller (not shown). The radio network controller may control network nodes 320 and may provide certain radio resource management functions, mobility management functions, and/or other suitable functions. In certain embodiments, the functions of the radio network controller may be included in the network node 320. The radio network controller may interface with the core network node 340. In certain embodiments, the radio network controller may interface with the core network node 340 via the interconnecting network 330.

The interconnecting network 330 may refer to any interconnecting system capable of transmitting audio, video, signals, data, messages, or any combination of the preceding. The interconnecting network 330 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, the core network node 340 may manage the establishment of communication sessions and various other functionalities for wireless devices 310. Examples of core network node 340 may include MSC, MME. SGW, PGW. O&M, OSS, SON, positioning node (e.g. E-SMLC). MDT node, etc. Wireless devices 310 may exchange certain signals with the core network node 340 using the non-access stratum layer. In non-access stratum signaling, signals between wireless devices 310 and the core network node 340 may be transparently passed through the radio access network. In certain embodiments, network nodes 320 may interface with one or more other network nodes over an internode interface. For example, network nodes 320 may interface each other over an X2 interface.

Although FIG. 1 illustrates a particular arrangement of network 300, the present disclosure contemplates that the various embodiments described herein may be applied to a variety of networks having any suitable configuration. For example, network 300 may include any suitable number of wireless devices 310 and network nodes 320, as well as any additional elements suitable to support communication between wireless devices or between a wireless device and another communication device (such as a landline telephone). The embodiments may be implemented in any appropriate type of telecommunication system supporting any suitable communication standards and using any suitable components, and are applicable to any radio access technology (RAT) or multi-RAT systems in which the wireless device receives and/or transmits signals (e.g., data). While certain embodiments are described for NR and/or LTE, the embodiments may be applicable to any RAT, such as UTRA, E-UTRA, narrow band internet of things (NB-IoT). WiFi, Bluetooth, next generation RAT (NR, NX), 4G, 5G, LTE FDD/TDD, etc.

The embodiments are described for LTE or LTE based systems such as MTC, eMTC, NB-IoT etc. As an example, MTC UE, eMTC UE and NB-IoT UE are also called UE category 0. UE category M1 and UE category NB1 respectively. However, the embodiments are applicable to any RAT or multi-RAT systems, where the UE receives and/or transmit signals (e.g. data) e.g. LTE FDD/TDD. WCDMA/HSPA. GSM/GERAN, Wi-Fi, WLAN, CDMA2000, 5G, NR, etc. It is recalled that 5G, the fifth generation of mobile telecommunications and wireless technology is not yet fully defined but in an advanced draft stage within 3GPP. It includes work on 5G New Radio (NR) Access Technology. LTE terminology is used in this disclosure in a forward looking sense, to include equivalent 5G entities or functionalities although a different term may be specified in 5G. A general description of the agreements on 5G New Radio (NR) Access Technology so far is contained in most recent versions of the 3GPP 38-series Technical Reports.

The embodiments are applicable for a UE in a low or in high activity state. Examples of low activity state are RRC idle state, idle mode etc. Examples of low activity state are RRC CONNECTED state, active mode, active state etc. The UE may be configured to operate in DRX or in non-DRX. If configured to operate in DRX, it may still operate according to non-DRX as long as it receives new transmissions from the network node.

The UE may operate under either normal coverage or enhanced coverage with respect to its serving cell. The enhanced coverage is also interchangeably called extended coverage. The UE may also operate in a plurality of coverage levels (CE) e.g. normal coverage (aka CE level 0), enhanced coverage level 1 (CE1), enhanced coverage level 2 (CE2), enhanced coverage level 3 (CE3) and so on.

The normal and extended coverage operations may typically take place on narrower UE Radio Frequency (RF) bandwidth compared with the system bandwidth, aka cell BW, cell transmission BW, DL system BW etc. In some embodiments, the UE RF BW can be the same as that of the system bandwidth. Examples of narrow RF BWs are 200 KHz, 1.4 MHz etc. Examples of system BW are 200 KHz, 1.4 MHz, 3 MHz, 5 MHz, 10, MHz, 15 MHz, 20 MHz etc. In case of extended/enhanced coverage, the UE may be capable of operating under lower signal quality level (e.g. SNR SINR, ratio of average received signal energy per subcarrier to total received power per subcarrier ($\hat{E}s/Iot$)), RSRQ etc.) compared to its capabilities when operating in legacy systems. The coverage level enhancement may vary with the operational scenario and may also depend on the UE type. For example, a UE which is located in a basement with bad coverage may need larger level of coverage enhancement (e.g. 20 dB) compared to a UE which is at a cell border (e.g. −3 dB).

The coverage level of the UE may be defined with respect to any cell e.g. serving cell, non-serving cell, neighbor cell etc. The coverage level is also interchangeably called as the coverage enhancement (CE) level. For example, the CE level with regards to a cell can be expressed in terms of signal level received at the UE from that cell. Alternatively, the CE level of the UE with regards to a cell can be expressed in terms of signal level received at the cell from the UE. As an example, a received signal level can be expressed in terms of received signal quality and/or received signal strength at the UE with regards to the cell. More specifically, the coverage level may be expressed in terms of:

received signal quality and/or received signal strength at the UE with regards to a cell; and/or
received signal quality and/or received signal strength at the cell with regards to the UE.

Examples of signal quality are SNR, SINR, CQI, RSRQ, NRSRQ, CRS $\hat{E}s/Iot$, SCH $\hat{E}s/Iot$ etc. Examples of signal strength are path loss, path gain, RSRP, NRSRP, SCH RP etc. The notation $\hat{E}s/Iot$ is defined as the ratio of:

$\hat{E}s$, which is the received energy per RE (power normalized to the subcarrier spacing) during the useful part of the symbol, i.e. excluding the cyclic prefix, at the UE antenna connector, to Iot which is the received power spectral density of the total noise and interference for a certain RE (power integrated over the RE and normalized to the subcarrier spacing) as measured at the UE antenna connector.

The CE level is also expressed in terms of two or more discrete levels or values e.g. CE level 1, CE level 2, CE level 3 etc. Consider an example of 2 coverage levels defined with regards to signal quality (e.g. SNR) at the UE comprising of:

Coverage enhancement level 1 (CE1) comprising of SNR≥−6 dB at the UE with regards to a cell; and
Coverage enhancement level 2 (CE2) comprising of −15 dB≤SNR<−6 dB at the UE with regards to a cell.

In the above example, the CE1 may also be interchangeably called as normal coverage level, baseline coverage level, reference coverage level, legacy coverage level etc. On the other hand, CE2 may be termed as enhanced coverage or extended coverage level.

In another example two different coverage levels (e.g. normal coverage and enhanced coverage) may be defined in terms of signal quality levels as follows:

The requirements for normal coverage are applicable for the UE category NB1 with regards to a cell provided that radio conditions of the UE with respect to that cell are defined as follows: SCH $\hat{E}s/Iot$≥−6 dB and CRS $\hat{E}s/Iot$≥−6.

The requirements for enhanced coverage are applicable for the UE category NB1 with regards to a cell provided that radio conditions of the UE with respect to that cell are defined as follows: SCH $\hat{E}s/Iot$≥−15 dB and CRS $\hat{E}s/Iot$≥−15.

In the above examples, $\hat{E}s/Iot$ is the ratio of received power per subcarrier to the total interference including noise per subcarrier.

First Aspect: Methods in a Network Node

Figure 2:
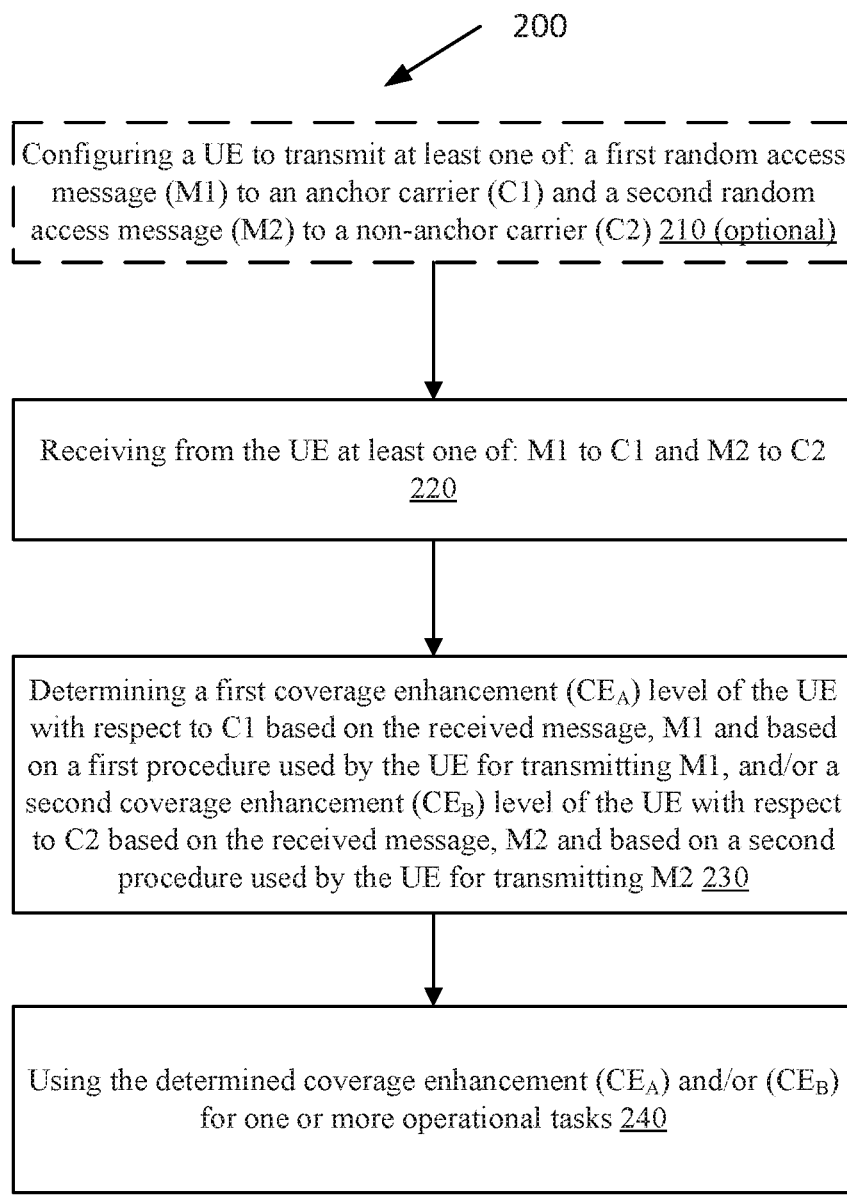
FIG. 2 illustrates a flow chart of a method in a network node, according to an embodiment.

FIG. 2 illustrates some embodiments of methods in a network node 320, such as an eNB, in accordance with a first aspect of the present disclosure.

Some embodiments of the method 200 according to this aspect comprise the following steps:

Step 210 (optional): Configuring a UE to transmit at least one of: a first random access message (M1) to an anchor carrier (C1) and a second random access message (M2) to a non-anchor carrier (C2).

Step 220: Receiving from the UE at least one of: M1 to C1 and M2 to C2.

Step 230: Determining a first coverage enhancement ($CE_A$) level of the UE with respect to C1 based on the received message, M1 and based on a first procedure used by the UE for transmitting M1, and/or a second coverage enhancement (CEe) level of the UE with respect to C2 based on the received message, M2 and based on a second procedure used by the UE for transmitting M2.

Step 240: Using the determined coverage enhancement ($CE_A$) and/or ($CE_B$) for one or more operational tasks.

Step 210

This step is optional. In this step, a network node configures the UE to transmit at least one of: a first random access message (M1) to an anchor carrier (C1) and a second random access message (M2) to a non-anchor carrier (C2). The network node operates C1 and C2.

For example, the UE may be configured or requested by the network node to send Random Access (RA) to C1 and/or C2 for one or more purposes or tasks.

Examples of such tasks which may be performed by the network node and/or the UE are:

For performing positioning measurements e.g. UE Rx-Tx time difference;

For acquiring timing advance for the UE;

For acquiring synchronization;

For load balancing e.g. for redirecting the UE from C1 to C2 at call step up.

The network node may send configuration message to the UE via system information on a broadcast channel and/or via UE specific message on a dedicated channel (e.g. PDSCH, NPDSCH etc.).

The network node further transmits to the UE information related to the radio resources to be used by the UE for transmitting the RA messages to C1 and/or C2.

Step 220

In this step, the network node receives at least one of the RA messages, M1 and M2, at C1 and C2 respectively. The received RA messages, M1 and/or M2, are transmitted by the UE using the radio resources, which in turn depends on the CE level as determined by the UE (i.e. in Step 270 of FIG. 3).

Step 230

In this step, the network node determines the CE level of UE based on the received RA message and on the associated procedure used by the UE for sending the RA message to the network node.

For example, if the message received at the network node is M1, then the network node determines the coverage enhancement ($CE_A$) level of the UE with respect to C1, based on at least the fact that the UE has used a first procedure (P1) for transmitting M1. But if the message received at the network node is M2, then the network node determines the coverage enhancement ($CE_B$) level of the UE with respect to C2 based on at least the fact that the UE has used a second procedure (P2) for transmitting M2.

In yet another aspect of this embodiment, the network node may further use the frequency relation between C1 and C2 to determine whether the UE has applied the same or different procedures for sending RA messages, M1 and M2 to C1 and C2 respectively.

The description and examples in step 270 of the method 250 in the UE (see FIG. 3) also apply here for the network node.

The network node may also use additional parameter or information for determining the CE level of the UE e.g. the number of repetition used by the UE for sending the RA message.

Step 240

In this step, the network node uses the information about the determined coverage enhancement level of the UE with regards to C1 and/or C2 (i.e. in step 230) for performing one or more operational tasks or actions or procedures. Examples of such tasks are:

Adapting the UE transmit power, e.g. allocating UL Transmit (Tx) power above power threshold to the UE if the CE level is larger than a certain CE threshold, otherwise allocating UL Tx power below the power threshold to the UE.

Adapting UL PC scheme e.g. using UL PC scheme associated with the determined CE level.

Scheduling the UE in DL and/or UL via C1 and/or C2.

Adapting scheduling the UE between C1 and C2, e.g. stopping scheduling the UE in DL and/or in UL on C1 and starting to schedule the UE on C2.

Informing other network nodes (e.g. core network node such as MME, neighboring network node etc.) about the determined CE level of the UE with regards to C1 and/or C2.

It is understood that in some embodiments, the blocks of the flowcharts above may occur out of the order noted in the figures. For example, two blocks shown in succession may, in fact, be executed substantially concurrently, or the blocks may sometimes be executed in the reverse order, depending upon the functionality involved.

Figure 10:
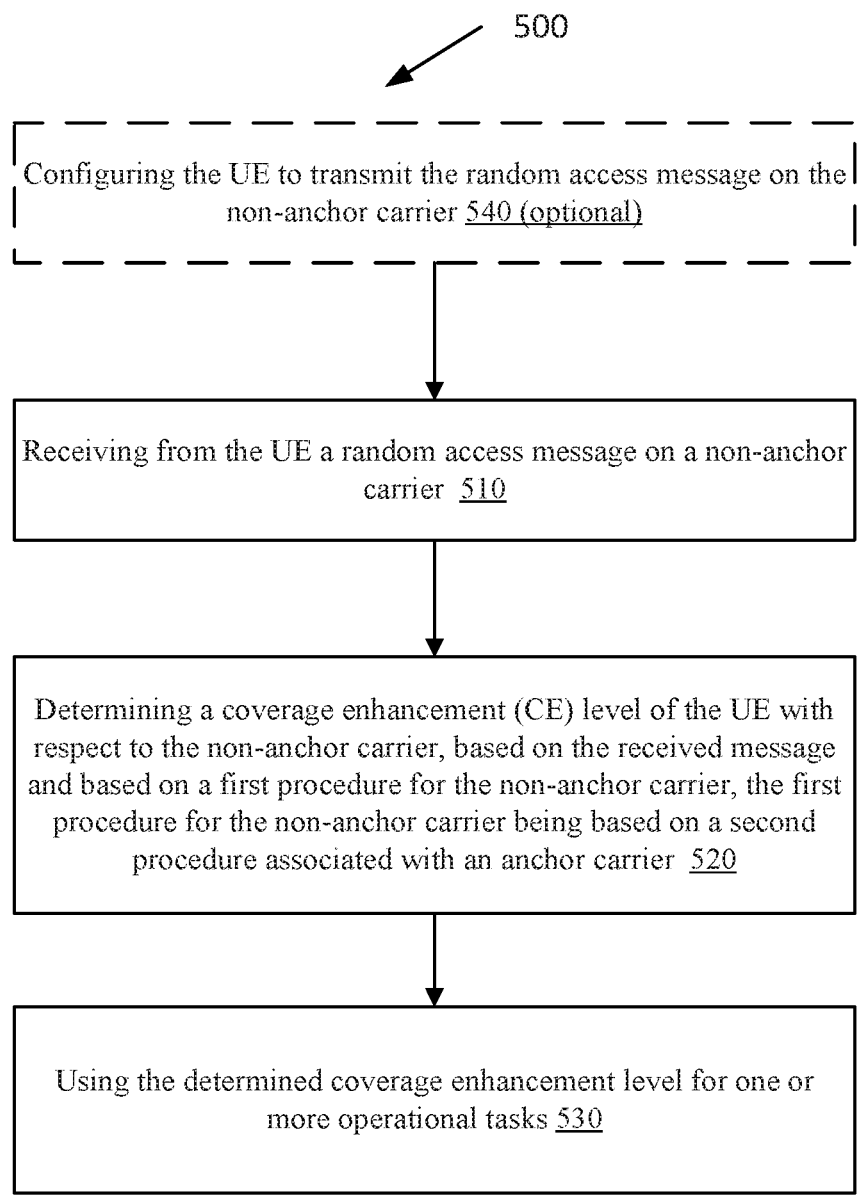
FIG. 10 illustrates a flow chart of a method in a network node, according to an embodiment.

For example, FIG. 10 illustrates a particular example of method 200, in which the random access messages received on a non-anchor carrier are considered. As such, FIG. 10 illustrates a method 500 for performing an operational task based on a determined CE level. The method can be performed in a network node, such as 320 of the network 300 for example.

Method 500 comprises:

Receiving from the UE a random access message on a non-anchor carrier (step 510);

Determining a coverage enhancement (CE) level of the UE with respect to the non-anchor carrier, based on the received message and based on a first procedure for the non-anchor carrier, the first procedure for the non-anchor carrier being based on a second procedure associated with an anchor carrier (step 520):

Using the determined coverage enhancement level for one or more operational tasks (step 530).

Optionally, method 500 can also comprise configuring the UE to transmit the random access message on a non-anchor carrier (step 540).

Step 540

This step is optional. The details discussed above with regards to step 210 and related to the non-anchor carrier equally apply to Step 540 as well.

Step 510

The details discussed above with regards to step 220 and related to the non-anchor carrier equally apply to Step 510 as well.

Step 520

There is an association between a CE level and a corresponding range of the measurement value. For example, assume there are two possible CE levels, i.e. 0 and 1. The UE performs a measurement (e.g. NRSRP) to obtain the measurement value and compare it with a first threshold (H1). If the measurement value (e.g. NRSRP) is larger than H1, then the CE level 0 is assumed by the UE; otherwise CE level 1 is assumed by the UE. The parameter H1 can be pre-defined or transmitted by the network node in a cell.

Furthermore, the details discussed above with regards to step 230 and related to the non-anchor carrier equally apply to Step 520 as well.

Step 530

The details discussed above with regards to step 240 and related to the non-anchor carrier equally apply to Step 530 as well.

Second Aspect: Methods in a UE

Figure 3:
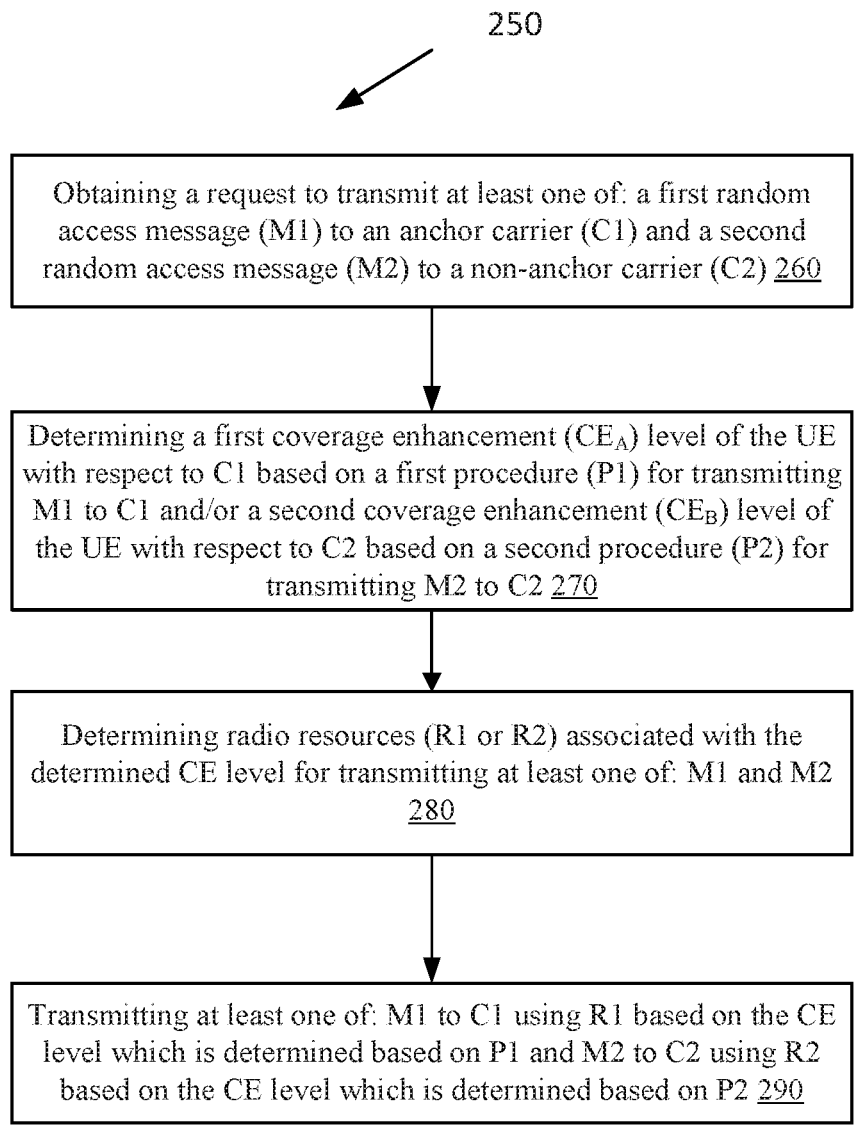
FIG. 3 illustrates a flow chart of a method in a user equipment, according to an embodiment.

FIG. 3 illustrates some embodiments of methods in a UE, such as a wireless device 310, in accordance with a second aspect of the present disclosure.

Some embodiments of the method 250 according to this aspect comprise the following steps:

Step 260: Obtaining a request to transmit at least one of: a first random access message (M1) to an anchor carrier (C1) and a second random access message (M2) to a non-anchor carrier (C2).

Step 270: Determining a first coverage enhancement ($CE_A$) level of the UE with respect to C1 based on a first procedure (P1) for transmitting M to C1 and/or a second coverage enhancement ($CE_B$) level of the UE with respect to C2 based on a second procedure (P2) for transmitting M2 to C2.

Step 280: Determining radio resources (R1 or R2) associated with the determined CE level for transmitting at least one of: M1 and M2.

Step 290: Transmitting at least one of: M1 to C1 using R1 based on the CE level which is determined based on P1 and M2 to C2 using R2 based on the CE level which is determined based on P2.

Step 260

In this step, the UE obtains a request from its higher layers to transmit at least one of: a first random access message (M1) to an anchor carrier (C1) and a second random access message (M2) to a non-anchor carrier (C2). The anchor and the non-anchor carriers are operated by a network node e.g. a base station, eNB etc.

Any of the random access (RA) messages (M1 or M2) can be contention based or it can be non-contention based. The messages M1 and M2 typically consist of a preamble sequence. The preamble sequence may be autonomously and randomly selected by the UE e.g. for contention based RA transmission. The preamble sequence may also be assigned or configured by the network node to the UE e.g. for non-contention based RA transmission. The message may further contain or be encoded with additional information e.g. UE identifier etc.

In one example, the request for sending the random access (RA) message is generated internally by the UE, i.e. by higher layers without receiving any external request from another node. For example, in this case the UE may decide to send RA when one or more condition is triggered, the conditions being e.g. receiving paging message, needing to acquire timing advanced command, data arrives in the UE buffer, UE initiated call etc.

In another example, the request for sending the random access (RA) message is generated by the higher layers, which in turn may receive a request from another node, e.g. from a network node such as the serving network node. In the latter case, the network node may also provide additional information to the UE for sending the RA message. Examples of additional information are pre-amble (aka RA sequence) to be used by the UE for sending the RA, identifier(s) of the carrier to which the RA is to be sent i.e. ID of C1 and/or C2, radio resources to be used by the UE for sending the RA etc. Examples of ID of the carrier are frequency channel number, ARFCN, EARFCN etc.

Step 270

In this step, in response to obtaining the request to send the RA to C1 and/or C2, the UE determines a coverage enhancement (CE) level of the UE with respect to the target carrier(s).

The UE uses different procedures to determine the CE level of the UE with respect to C1 or C2. For example, the UE applies:

a first procedure (P1) to determine a first coverage enhancement ($CE_A$) level for transmitting the RA message, M1, to C1 and a second procedure (P2) to determine a second coverage enhancement ($CE_B$) level for transmitting RA message, M2, to C2.

As described earlier, the CE level of the UE with regards to a cell (e.g. anchor or non-anchor carrier) is typically based on one or more radio measurements, e.g. signal strength with regards to the cell estimated by the UE. Therefore, examples of procedures are measurement procedures used by the UE for performing or deriving one or more radio measurements, which in turn are used by the UE for determining the CE level of the UE. One example of P1 is a procedure to perform measurement or derive measurement results for a cell of serving carrier frequency, aka intra-frequency measurement. One example of P2 is a procedure to perform measurement or derive measurement results for a cell of non-serving carrier frequency. Examples of measurement on non-serving carrier are inter-frequency measurement, inter-RAT measurement. Different procedures are required because the UE typically performs measurements on anchor carrier, but a non-anchor carrier is different than the anchor carrier. This difference in the frequency leads to different radio characteristics and may result in different coverage levels, e.g. path loss.

The intra-frequency and inter-frequency measurements are associated with one or more different set of requirements, aka measurement requirements, performance requirements, accuracies etc. Examples of requirements are measurement time (aka measurement period or L1 measurement period), measurement accuracy, signal level or signal quality (e.g. down to which requirements that are to be applied, etc.). For example, the requirements may apply down to signal level (e.g. NRSRP) of −120 dBm and/or down to signal level (e.g. SINR) of −15 dB. Measurement accuracy may be any of: absolute accuracy and relative accuracy. For example, the intra-frequency NRSRP absolute measurement accuracy may be Y1 dB better than that of the inter-frequency NRSRP absolute measurement accuracy. In another example, the intra-frequency NRSRP relative measurement accuracy may be Y2 dB better than that of the inter-frequency NRSRP relative measurement accuracy. Examples of Y1 and Y2 are 2 dB and 3 dB respectively.

Due to the differences between at least some of the requirements related to the measurement based on procedure P1 and measurement based on procedure P2, the CE level determined by the UE for sending M1 and M2 to C1 and C2 respectively can also be different. This is explained with a few examples as described below:

In one example, assume that the UE is required to send a RA to C1. In this case the UE performs intra-frequency measurement (e.g. NRSRP) on C1 and determines that the measurement value of NRSRP is X1 dBm. The UE further compares the measurement value of NRSRP with one or more thresholds and determines the CE level. For example, assuming one threshold (i.e. two CE levels): if X1 is below threshold (H1) then the UE determines that the CE level is #2 (i.e. $CE_{A2}$); otherwise if X2≥H1 then the UE determines that the CE level is #1 i.e. $CE_{A1}$. In this example, it is assumed that CE level 2 leads to larger coverage compared to CE level 1. The threshold parameter H1 can be pre-defined or configured by the network node.

In a second example, assume that the UE is required to send a RA to C2. In this case, the UE performs inter-frequency measurement (e.g. NRSRP) on C2 or alternatively derives inter-frequency measurement value for C2 based on intra-frequency measurement performed on C1. For example, assume that the intra-frequency measurement value (e.g. NRSRP) measured or estimated by the UE is X dBm. The magnitude of the measurement accuracy of the intra-frequency measurement (e.g. NRSRP) is X1 dB and the magnitude of the measurement accuracy of the inter-frequency measurement (e.g. NRSRP) is Y1 dB. The measurement accuracies can be pre-defined e.g. in the specification. Then in one example, the inter-frequency measurement (Y) is derived from the intra-frequency measurement using the following function: $Y=f(X, X1, Y1)$. In one specific example, Y can be expressed by the following specific function e.g. $Y=X-(X1-Y1)$. In another specific example, Y can be expressed by the following specific function e.g. $Y=X-|X1-Y1|$. In any case, the UE determines that the measurement value of NRSRP for C2 is X2 dBm. The UE further compares the measurement value of NRSRP with one or more thresholds and determines the CE level. Also, assuming one threshold (i.e. two CE levels): if X2 is below threshold (H2) then the UE determines that the CE level is #2 (i.e. $CE_{B2}$); otherwise if X2≥H2 then the UE determines that the CE level is #1 i.e. $CE_{B1}$. In examples 1 and 2, the values of X1 and X2 may differ by a certain margin (M). Typically, the magnitude of X2 is larger than the magnitude of X1 e.g. $|X2| \geq X1+M$. As an example, M can be about 2 dB. The threshold parameter H2 can be pre-defined or configured by the network node.

From the second example and the examples given for the procedures above, it will be appreciated that the second procedure associated with the non-anchor carriers can be understood as being based on the first procedure associated with the anchor carrier.

In a third example, assume that the UE is required to send both RA messages, M1 and M2 to C1 and C2 respectively. The threshold parameters H1 and H2 for selecting CE levels for C1 and C2 can be the same or can be different. In this example, it is assumed that H1=H2=H. It is further assumed that X1 and X2 are −90 dBm and −93 dBm respectively, and H=−91 dBm. The difference in X1 and X2 is due to different measurement procedures applied by the UE for estimating or deriving X1 and X2, i.e. X1 and X2 are based on intra-frequency and inter-frequency measurement respectively. In this example, since X1>H therefore UE CE level with regards to C1 (i.e. $CE_A$) is #1 (i.e. $CE_{A1}$). But since X2<H therefore UE CE level with regards to C2 (i.e. $CE_B$) is #2 (i.e. $CE_{B2}$). This example clearly illustrates that differences in the procedures (P1 and P2) for deriving the CE levels for sending M1 and M2 to C1 and C2 respectively, leads to different CE levels.

The above examples are explained with 2 CE levels and one threshold for selecting the CE level. The above examples can be extended for any number (N) of CE levels and any number (N-1) of corresponding thresholds. For example, two threshold parameters are configured or pre-defined in order to enable the UE to select between 3 possible CE levels.

In yet another aspect of this embodiment, the UE may not always apply different procedures for determining CE levels with regards to C1 and C2. For example, the UE may apply either the same or different procedures for determining CE levels with regards to C and C2 based on the frequency relation between C1 and C2. In other words, the UE has to select the same or different procedures for deriving CE level based on the frequency relation between C1 and C2. For example, if C1 and C2 are within certain frequency range (ΔF), then the UE applies the same procedure for performing or deriving measurement for determining the CE level with regards to both C1 and C2. But if C1 and C2 are not within a certain frequency range, then the UE applies different procedures for performing or deriving measurement for determining the CE level with regards to C1 and C2. Another example of the frequency relation is whether C1 and C2 are in the same frequency bands or if they are in different frequency bands. Yet another example of the frequency relation is whether C1 and C2 are below a certain frequency threshold or if they are equal to or larger than that the frequency threshold. This is explained with the examples below:

In one example, assume that C1 and C2 are within a certain frequency range, ΔF=60 MHz e.g. C=1800 MHz and C2=1830 MHz. In this case, the UE uses the same procedure (P1) for deriving CE levels for sending M1 and M2 to C1 and C2 respectively. For example, the UE may perform only intra-frequency measurements on C1 and use the same value for determining the CE levels with regards to C1 and C2. In case the thresholds. H1 and H2, are the same then the determined CE level with regards to C1 and CE level with regards to C2 are also the same.

In a second example, assume that C1 and C2 are outside a certain frequency range, ΔF=60 MHz e.g. C1=1800 MHz and C2=2000 MHz. In this case, the UE uses different procedures (P1 and P2) for deriving the CE levels for sending M1 and M2 to C1 and C2 respectively. For example, the UE may perform intra-frequency measurements (i.e. based on procedure P1) on C1 and use it for determining the CE levels with regards to C1. But the UE may perform or derive inter-frequency measurements (i.e. based on procedure P2) on C2 and use it for determining the CE levels with regards to C2. In this case depending on the thresholds, H1 and H2, and the values of the measurements, the determined CE level with regards to C1 and CE level with regards to C2 may be the same or they may be different.

In a third example, assume that C and C2 belong to the same frequency band. In this case regardless of the difference between frequencies C1 and C2, the UE uses the same procedure (P1) for deriving the CE levels for sending M1 and M2 to C1 and C2 respectively. For example, the UE may perform only intra-frequency measurement on C1 and use the same value for determining the CE levels with regards to C1 and C2.

In a fourth example, assume that C1 and C2 belong to different frequency bands. In this case regardless of the difference between frequencies C1 and C2, the UE uses the different procedures (P1 and P2) for deriving the CE levels for sending M1 and M2 to C1 and C2 respectively. For example, the UE may perform intra-frequency measurements on C1 and use this for determining the CE levels with regards to C1. But the UE may perform or derive inter-frequency measurements (i.e. based on procedure P2) on C2 and use it for determining the CE levels with regards to C2.

In a fifth example, assume that C1 and C2 are below 1 GHz e.g. C1=700 MHz and C2=900 MHz. In this case regardless of the difference between frequencies C1 and C2, the UE uses the same procedure (P1) for deriving the CE levels for sending M1 and M2 to C1 and C2 respectively. For example, the UE may perform only intra-frequency measurements on C1 and use the same value for determining the CE levels with regards to C1 and C2.

In a sixth example, assume that C and C2 are equal to or larger than 1 GHz e.g. C1=1.4 GHz and C2=2 GHz. In this case, regardless of the difference between frequencies C1 and C2, the UE uses the different procedures (P1 and P2) for deriving the CE levels for sending M1 and M2 to C1 and C2 respectively. For example, the UE may perform intra-frequency measurements on C1 and use this for determining the CE levels with regards to C1. But the UE may perform or derive inter-frequency measurements (i.e. based on procedure P2) on C2 and use it for determining the CE levels with regards to C2.

In yet another aspect of this embodiment, the UE may apply the procedures for determining the CE levels with regards to C1 and C2 if the carrier frequencies of C1 and C2 are the same. For example, if the network node uses the same frequency (e.g. ARFNC, EARFCN) to configure the anchor carrier and the non-anchor carrier but in different time resources, then the UE may apply the first procedure to perform measurements for deriving the CE level with regards to both C1 and C2. For example, frequency FI (e.g. 1800 MHz) can be used to configure anchor carrier (C1) in certain DL subframes (e.g. subframes #0, #4, #5 in every frame and subframe #9 in every other frame) and while also FI can be used to configure the non-anchor carrier (C2) in DL subframe #6 and #7. In this example, the UE may perform intra-frequency measurements on C1 and use the same measurement value for deriving the CE level of the UE with regards to C1 and C2. In other words, the UE does not have to perform another measurement on C2. This in turn reduces the UE complexity and processing.

Step 280

In this step, the UE further uses the determined CE level in step 270 to determine the radio resources to be used by the UE for transmitting the RA messages (M1 and/or M2) to C1 and/or C2 respectively.

The radio resources are associated with the CE levels. The UE may obtain the association or mapping between the radio resources and the CE levels based on one or more of the following:

Pre-defined relation or mapping;
Information received from another node e.g. information signaled by the network node to the UE:
Historical data or statistics;
Recently used radio resources for the given CE level of the UE with regards to C1 and/or C2.
Examples of radio resources are:
Pre-amble identifier e.g. RA sequence:
Number of repetitions per RA attempt (Rp);
Maximum number of RA attempts (Rr);
UE transmit power level(s) for sending the RA to C1 and/or C2; etc.

As an example, the values of Rp and/or Rr may be different for different CE levels. For example, Rp is larger for larger CE levels while smaller for smaller CE levels. As an example, if the UE determines CE level 2 then the value of Rp=128. But if the UE determines CE level 1 then the value of Rp=16.

In another example, the UE transmit power required to transmit RA may be larger for larger values of CE level e.g. 20 dBm and 16 dBm for CE level 2 and CE level 1 respectively.

Step 290

In this step, the UE uses the determined or derived radio resources (in step 280) based on the determined CE level (in step 270), to transmit at least one of the RA messages, M1 and M2, to C1 and C2 respectively. If the UE does not have enough radio resources to transmit both M and M2 at the same time, then the UE may send the RA using any of the following principles. The contents of messages M1 and M2 are described in relation to Step 260 of the method 250 performed by the UE (i.e. see FIG. 3). These may be pre-defined, chosen by the UE or configured by the network node:

in one example, the UE may send either M1 or M2,
in another example, the UE may send only M1 and abort M2,
in yet another example, the UE may first send M1 and later send M2,
in yet another example, the UE may first send M2 and later send M1,
in yet another example, the UE may send only RA message which is contention based,
in yet another example, the UE may send only RA message which is non-contention based.

It is understood that in some embodiments, the blocks of the flowcharts above may occur out of the order noted in the figures. For example, two blocks shown in succession may, in fact, be executed substantially concurrently, or the blocks may sometimes be executed in the reverse order, depending upon the functionality involved.

Figure 9:
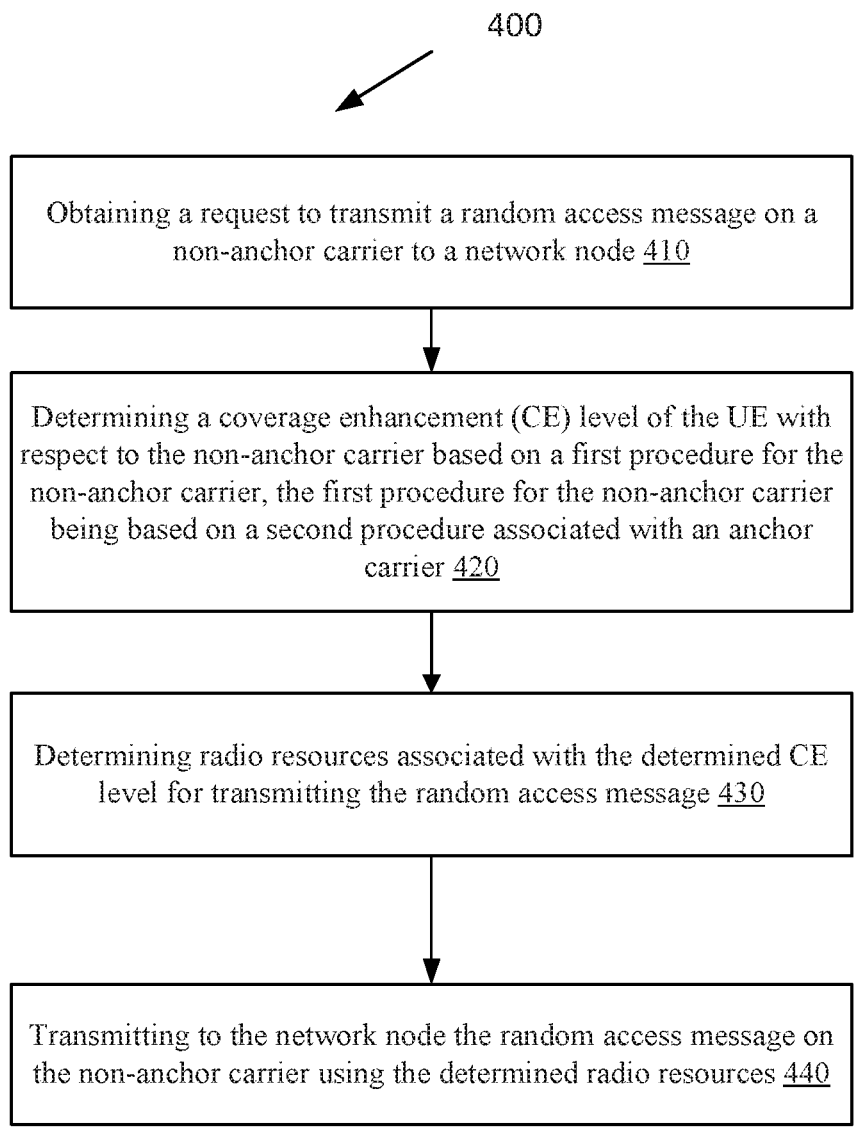
FIG. 9 illustrates a flow chart of a method in a user equipment, according to an embodiment.

For example, FIG. 9 illustrates a specific example of method 250, in which transmissions of random access messages on the non-anchor carrier are considered. As such, FIG. 9 illustrates a method 400 for transmitting a random access message on a non-anchor carrier. Method 400 can be performed in a wireless device or UE, such as 310.

Method 400 comprises:

Obtaining a request to transmit a random access message on a non-anchor carrier to a network node (step 410);

Determining a coverage enhancement (CE) level of the UE with respect to the non-anchor carrier based on a first procedure for the non-anchor carrier, the first procedure for the non-anchor carrier being based on a second procedure associated with an anchor carrier (step 420);

Determining radio resources associated with the determined CE level for transmitting the random access message (step 430);

Transmitting to the network node the random access message on the non-anchor carrier using the determined radio resources (step 440).

Step 410

The details of obtaining the request discussed above with regards to step 260 of method 250 equally apply to step 410.

Step 420

Regarding step 420, it should be noted that the first procedure corresponds to the procedure associated with the non-anchor carrier and the second procedure corresponds to the procedure associated with the anchor carrier.

In some embodiments, the first procedure for the non-anchor carrier can comprise performing inter-frequency measurements.

In some embodiments, the second procedure associated with the anchor carrier can comprise performing intra-frequency measurements.

Furthermore, the inter-frequency measurements can be derived from the intra-frequency measurements.

As mentioned above, the non-anchor carrier and the anchor carrier may not have the same properties. As such, the measurements on the anchor carrier may not be accurate enough to be used in the random access procedure on the non-anchor carrier. An adaptation is needed for example. By deriving the inter-frequency measurements from the intra-frequency measurements, the measurements are adapted for the non-anchor carrier. This is because the UE will use the derived or adapted measurement for transmitting the random access on the non-anchor carrier.

In some embodiments, to determine the CE level, the UE may compare the intra-frequency measurements with a threshold value.

In some embodiments, the UE may further receive a request to transmit a random access message on the anchor carrier to the network node.

In some embodiments, the UE may determine if the non-anchor carrier and the anchor carrier are within a certain frequency range. If the non-anchor carrier and the anchor carrier are within the certain frequency range, the UE may apply the same procedure for determining the CE level for the non-anchor carrier and the CE level for the anchor carrier. This procedure is the second procedure associated with the anchor carrier, for example.

If the non-anchor carrier and the anchor carrier are not within the certain frequency range, then the UE may apply different procedures for determining the CE level for the non-anchor carrier and the CE level for the anchor carrier. For example, the UE uses the first procedure associated with the non-anchor carrier for determining the CE level for the non-anchor carrier and the second procedure associated with the anchor carrier for determining the CE level for the anchor carrier.

In some embodiments, the UE may determine if the non-anchor carrier and the anchor carrier belong to the same frequency band.

If the non-anchor carrier and the anchor carrier belong to the same frequency band, the UE can apply the same procedure for determining the CE level for the non-anchor carrier and the CE level for the anchor carrier, the procedure being the second procedure associated with the anchor carrier.

If the non-anchor carrier and the anchor carrier do not belong to the same frequency band, the UE may apply different procedures for determining the CE level for the non-anchor carrier and a CE level for the anchor carrier. For example, the UE can use the first procedure associated with the non-anchor carrier for determining the CE level for the non-anchor carrier and the second procedure associated with the anchor carrier for determining the CE level for the anchor carrier.

In some embodiments, the UE may determine that the non-anchor carrier and the anchor carrier are below a frequency threshold. In a such case, the UE can apply the same procedure for determining the CE level for the non-anchor carrier and the CE level for the anchor carrier. The procedure can be the second procedure associated with the anchor carrier.

In some embodiments, the UE may determine that the non-anchor carrier and the anchor carrier are equal or larger than 1 GHz. In this case, the UE may apply different procedures for determining the CE level for the non-anchor carrier and the CE level for the anchor carrier. For example, the UE can use the first procedure associated with the non-anchor carrier for determining the CE level for the non-anchor carrier and the second procedure associated with the anchor carrier for determining the CE level for the anchor carrier.

In some embodiments, the UE may determine that the non-anchor carrier and the anchor carrier have the same carrier frequency. In this case, the UE may apply the same procedure for determining the CE level for the non-anchor carrier and the CE level for the anchor carrier. The procedure can be the second procedure associated with the anchor carrier, for example.

Step 430

The details for determining the CE level discussed above with regards to step 280 of method 250 equally applies to step 430.

Step 440

The details for transmitting the random access message discussed above with regards to step 290 of method 250 equally applies to step 440.

For example, in some embodiments, the UE may determine a lack of radio resources for transmitting the random access message on the anchor carrier and the random access message on the non-anchor carrier.

In this case, the UE may perform one of the following:
transmit the random access message on the anchor carrier and abort the random access message on the non-anchor carrier;
transmit first the random access message on the anchor carrier and later transmit the random access message on the non-anchor carrier; and
transmit first the random access message on the non-anchor carrier and then the random access message on the anchor carrier.

Figure 4:
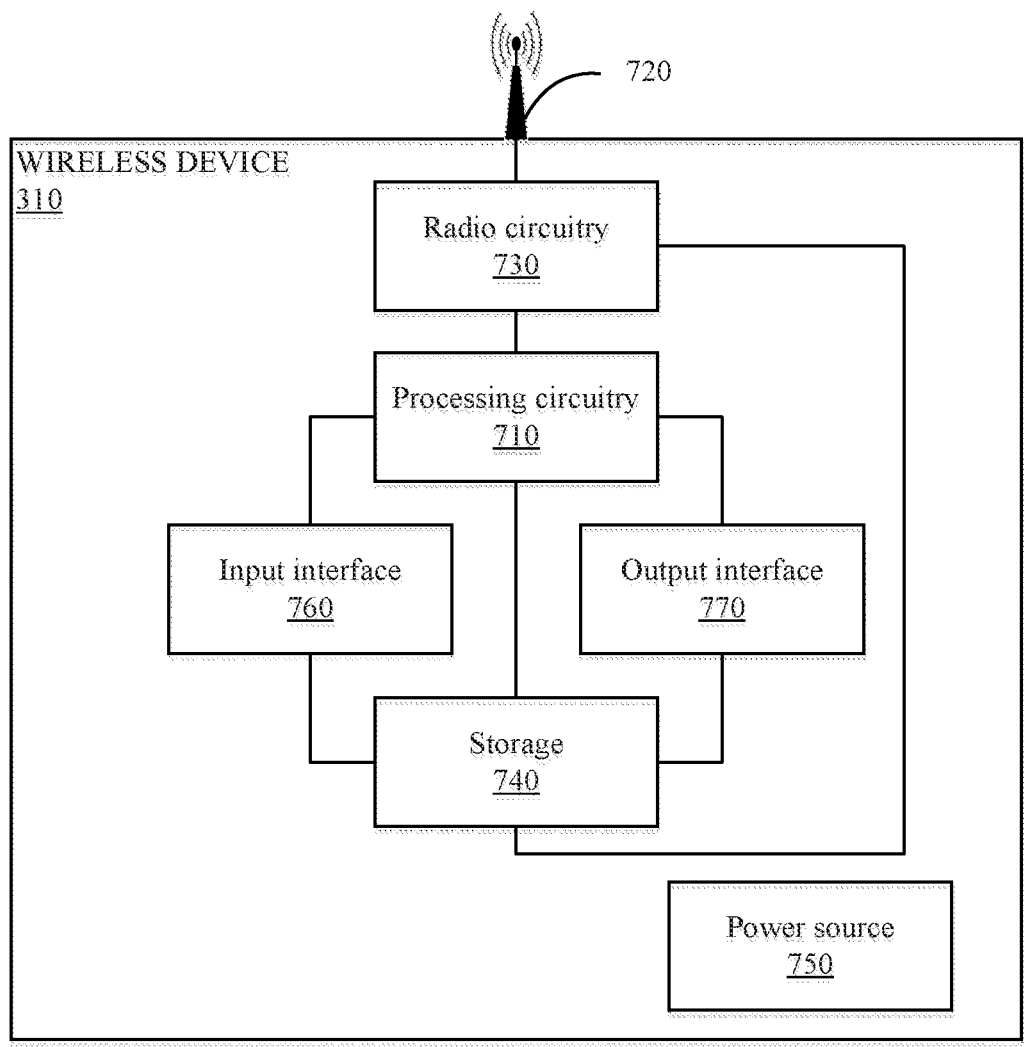
FIG. 4 illustrates a schematic diagram of a wireless device according to an embodiment.

FIG. 4 illustrates a user equipment (UE) 310, which is an example wireless device. UE 310 includes an antenna 720, radio front-end circuitry 730, processing circuitry 710, and a computer-readable storage medium 740. Antenna 720 may include one or more antennas or antenna arrays, and is configured to send and/or receive wireless signals, and is connected to radio front-end circuitry 730. In certain alternative embodiments, UE 310 may not include antenna 720, and antenna 720 may instead be separate from UE 310 and be connectable to UE 310 through an interface or port.

The radio front-end circuitry 730 may comprise various filters and amplifiers, is connected to antenna 720 and processing circuitry 710, and is configured to condition signals communicated between antenna 720 and processing circuitry 710. In certain alternative embodiments, UE 310 may not include radio front-end circuitry 730, and processing circuitry 710 may instead be connected to antenna 720 without radio front-end circuitry 730.

Processing circuitry 710 may include one or more of radio frequency (RF) transceiver circuitry, baseband processing circuitry, and application processing circuitry. In some embodiments, the RF transceiver circuitry, baseband processing circuitry, and application processing circuitry may be on separate chipsets. In alternative embodiments, part or all of the baseband processing circuitry and application processing circuitry may be combined into one chipset, and the RF transceiver circuitry may be on a separate chipset. In still alternative embodiments, part or all of the RF transceiver circuitry and baseband processing circuitry may be on the same chipset, and the application processing circuitry may be on a separate chipset. In yet other alternative embodiments, part or all of the RF transceiver circuitry, baseband processing circuitry, and application processing circuitry may be combined in the same chipset. Processing circuitry 710 may include, for example, one or more central processing units (CPUs), one or more microprocessors, one or more application specific integrated circuits (ASICs), and/or one or more field programmable gate arrays (FPGAs).

In particular embodiments, some or all of the functionality described herein as being provided by a wireless device may be provided by the processing circuitry 710 executing instructions stored on a computer-readable storage medium 740. In alternative embodiments, some or all of the functionality may be provided by the processing circuitry 710 without executing instructions stored on a computer-readable medium, such as in a hard-wired manner. In any of those particular embodiments, whether executing instructions stored on a computer-readable storage medium or not, the processing circuitry can be said to be configured to perform the described functionality. The benefits provided by such functionality are not limited to the processing circuitry 710 alone or to other components of UE 310, but are enjoyed by the wireless device or UE as a whole, and/or by end users and the wireless network generally.

Antenna 720, radio front-end circuitry 730, and/or processing circuitry 710 may be configured to perform any receiving operations described herein as being performed by a wireless device. Any information, data and/or signals may be received from a network node and/or another wireless device.

The processing circuitry 710 may be configured to perform any determining operations described herein as being performed by a wireless device. For example, the processing circuitry is configured to perform methods 400 of FIG. 9 and 250 of FIG. 3. Determining as performed by processing circuitry 710 may include processing information obtained by the processing circuitry 710 by, for example, converting the obtained information into other information, comparing the obtained information or converted information to information stored in the wireless device, and/or performing one or more operations based on the obtained information or converted information, and as a result of said processing making a determination.

Antenna 720, radio front-end circuitry 730, and/or processing circuitry 710 may be configured to perform any transmitting operations described herein as being performed by a wireless device. Any information, data and/or signals may be transmitted to a network node and/or another wireless device.

Computer-readable storage medium 740 is generally operable to store instructions, such as a computer program, software, an application including one or more of logic, rules, code, tables, etc. and/or other instructions capable of being executed by a processor. Examples of computer-readable storage medium 740 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or any other volatile or non-volatile, non-transitory computer-readable and/or computer-executable memory devices that store information, data, and/or instructions that may be used by processing circuitry 710. In some embodiments, processing circuitry 710 and computer-readable storage medium 740 may be considered to be integrated.

Alternative embodiments of UE 310 may include additional components beyond those shown in FIG. 4 that may be responsible for providing certain aspects of the UE's functionality, including any of the functionality described herein and/or any functionality necessary to support the solution described above. As just one example, UE 310 may include input interfaces 760, devices and circuits, and output interfaces 770, devices and circuits. Input interfaces, devices, and circuits are configured to allow input of information into UE 310, and are connected to processing circuitry 710 to allow processing circuitry 710 to process the input information. For example, input interfaces 760, devices, and circuits may include a microphone, a proximity or other sensor, keys/buttons, a touch display, one or more cameras, a USB port, or other input elements. Output interfaces 770, devices, and circuits are configured to allow output of information from UE 310, and are connected to processing circuitry 710 to allow processing circuitry 710 to output information from UE 310. For example, output interfaces 770, devices, or circuits may include a speaker, a display, vibrating circuitry, a USB port, a headphone interface, or other output elements. Using one or more input and output interfaces (760 and 770), devices, and circuits, UE 310 may communicate with end users and/or the wireless network, and allow them to benefit from the functionality described herein.

As another example, UE 310 may include power source 750. Power source 750 may comprise power management circuitry. Power source 750 may receive power from a power supply, which may either be comprised in, or be external to, power source 750. For example, UE 310 may comprise a power supply in the form of a battery or battery pack which is connected to, or integrated in, power source 750. Other types of power sources, such as photovoltaic devices, may also be used. As a further example, UE 310 may be connectable to an external power supply (such as an electricity outlet) via an input circuitry or interface such as an electrical cable, whereby the external power supply supplies power to power source 750. Power source 750 may be connected to radio front-end circuitry 730, processing circuitry 710, and/or computer-readable storage medium 740 and be configured to supply UE 310, including processing circuitry 710, with power for performing the functionality described herein.

UE 310 may also include multiple sets of processing circuitry 710, computer-readable storage medium 740, radio circuitry 730, and/or antenna 720 for different wireless technologies integrated into wireless device 310, such as, for example, GSM, WCDMA, LTE, NR, WiFi, or Bluetooth wireless technologies. These wireless technologies may be integrated into the same or different chipsets and other components within wireless device or UE 310 Other embodiments of wireless device 310 may include additional components beyond those shown in FIG. 4 that may be responsible for providing certain aspects of the wireless device's functionality, including any of the functionality described above and/or any additional functionality (including any functionality necessary to support the solution described above). As just one example, wireless device 310 may include input devices and circuits, output devices, and one or more synchronization units or circuits, which may be part of the one or more processors. Input devices include mechanisms for entry of data into wireless device 310. For example, input devices may include input mechanisms, such as a microphone, input elements, a display, etc. Output devices may include mechanisms for outputting data in audio, video and/or hard copy format. For example, output devices may include a speaker, a display, etc.

Figure 5:
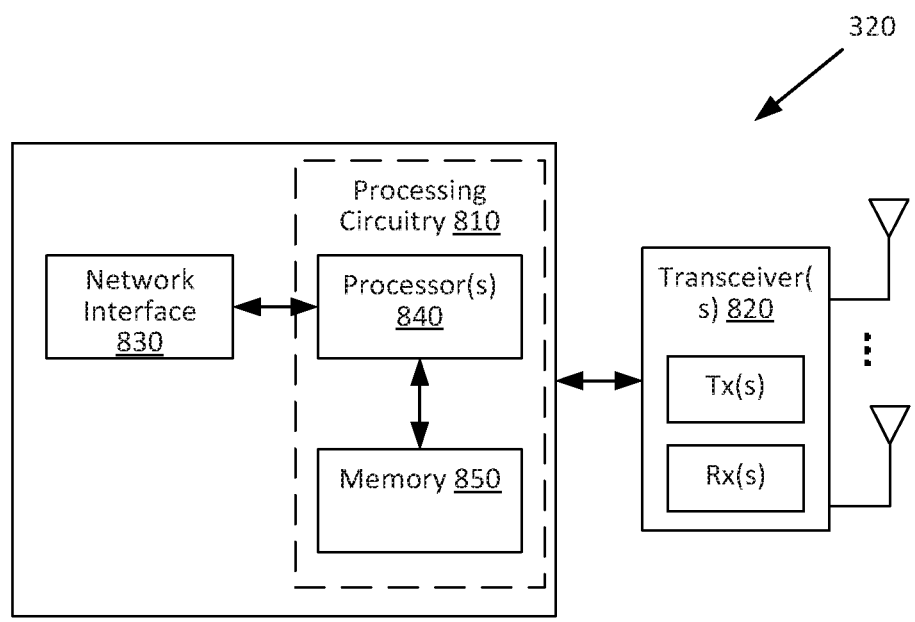
FIG. 5 illustrates a schematic diagram of a network node according to an embodiment.

FIG. 5 is a block diagram of an exemplary network node 320, which can be a base station, eNb, or gNB, for example, in accordance with certain embodiments. The network node 320 includes processing circuitry 810, network interface 830 and one or more transceivers 820. The circuitry 810 may include one or more processors 840, and memory 850. In some embodiments, the transceiver 820 facilitates transmitting wireless signals to and receiving wireless signals from wireless device 310 (e.g., via an antenna), the one or more processors 840 executes instructions to provide some or all of the functionalities described above as being provided by the network node 320, the memory 850 stores the instructions for execution by the one or more processors 840, and the network interface 830 communicates signals to backend network components, such as a gateway, switch, router, Internet, Public Switched Telephone Network (PSTN), core network nodes or radio network controllers, etc.

The one or more processors 840 may include any suitable combination of hardware and software implemented in one or more modules to execute instructions and manipulate data to perform some or all of the described functions of the network node 320, such as those described above. For example, the one or more processors 840 may be configured to perform method 200 of FIG. 2 and method 500 of FIG. 10.

In some embodiments, the one or more processors 840 may include, for example, one or more computers, one or more central processing units (CPUs), one or more microprocessors, one or more applications, one or more application specific integrated circuits (ASICs), one or more field programmable gate arrays (FPGAs) and/or other logic. In certain embodiments, the one or more processors 840 may comprise one or more of the modules discussed below with respect to FIG. 5.

The memory 850 is generally operable to store instructions, such as a computer program, software, an application including one or more of logic, rules, algorithms, code, tables, etc. and/or other instructions capable of being executed by one or more processors 840. Examples of memory 850 include computer memory (for example, Random Access Memory (RAM) or Read Only Memory (ROM)), mass storage media (for example, a hard disk), removable storage media (for example, a Compact Disk (CD) or a Digital Video Disk (DVD)), and/or or any other volatile or non-volatile, non-transitory computer-readable and/or computer-executable memory devices that store information.

In some embodiments, the network interface 830 is communicatively coupled to the one or more processors 840 and may refer to any suitable device operable to receive input for the network node 320, send output from the network node 320, perform suitable processing of the input or output or both, communicate to other devices, or any combination of the preceding. The network interface 830 may include appropriate hardware (e.g., port, modem, network interface card, etc.) and software, including protocol conversion and data processing capabilities, to communicate through a network.

Other embodiments of the network node 320 may include additional components beyond those shown in FIG. 5 that may be responsible for providing certain aspects of a network node's functionality, including any of the functionality described above and/or any additional functionality (including any functionality necessary to support the solutions described above). The various different types of network nodes may include components having the same physical hardware but configured (e.g., via programming) to support different radio access technologies, or may represent partly or entirely different physical components.

Processors, interfaces, and memory similar to those described with respect to FIGS. 4-5 may be included in other network nodes (such as core network node 340). Other network nodes may optionally include or not include a wireless interface (such as the transceiver described in FIG. 5). Functionalities described may reside within the same radio node or network node or may be distributed across a plurality of radios nodes and network nodes.

Figure 6:
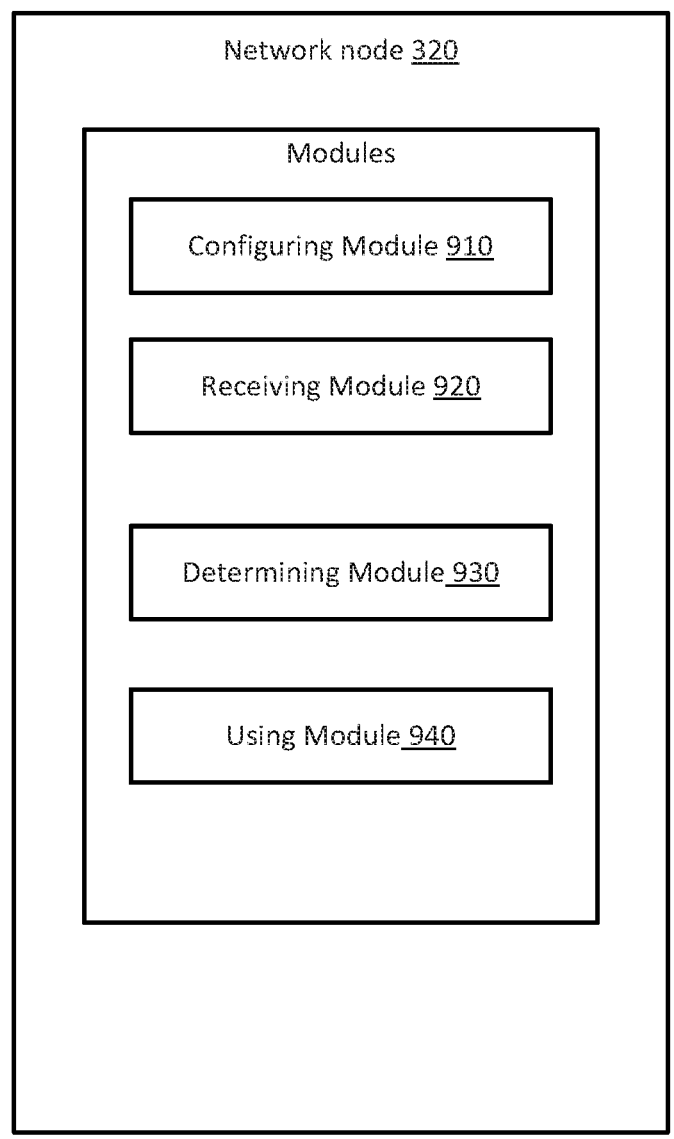
FIG. 6 illustrates a schematic diagram of a network node according to another embodiment.

FIG. 6 illustrates an example of the network node 320 in accordance with certain embodiments. The network node 320 may include a configuring module 910, a receiving module 920, a determining module 930 and a using module 940.

In certain embodiments, the configuring module 910 may perform steps such as Steps 210 in FIGS. 2 and 540 in FIG. 10.

In certain embodiments, the receiving module 920 may perform steps such as Step 220 in FIG. 2 and step 510 in FIG. 10.

In certain embodiments, the determining module 930 may perform steps such as Step 230 in FIG. 2 and step 520 in FIG. 10.

In certain embodiments, the using module 940 may perform steps such as Step 240 in FIG. 2 and step 530 in FIG. 10.

In certain embodiments, the configuring module 910, receiving module 920, determining module 930 and using module 940 may be implemented using one or more processors, such as those described with respect to FIG. 5. The modules may be integrated or separated in any manner suitable for performing the described functionality.

Figure 7:
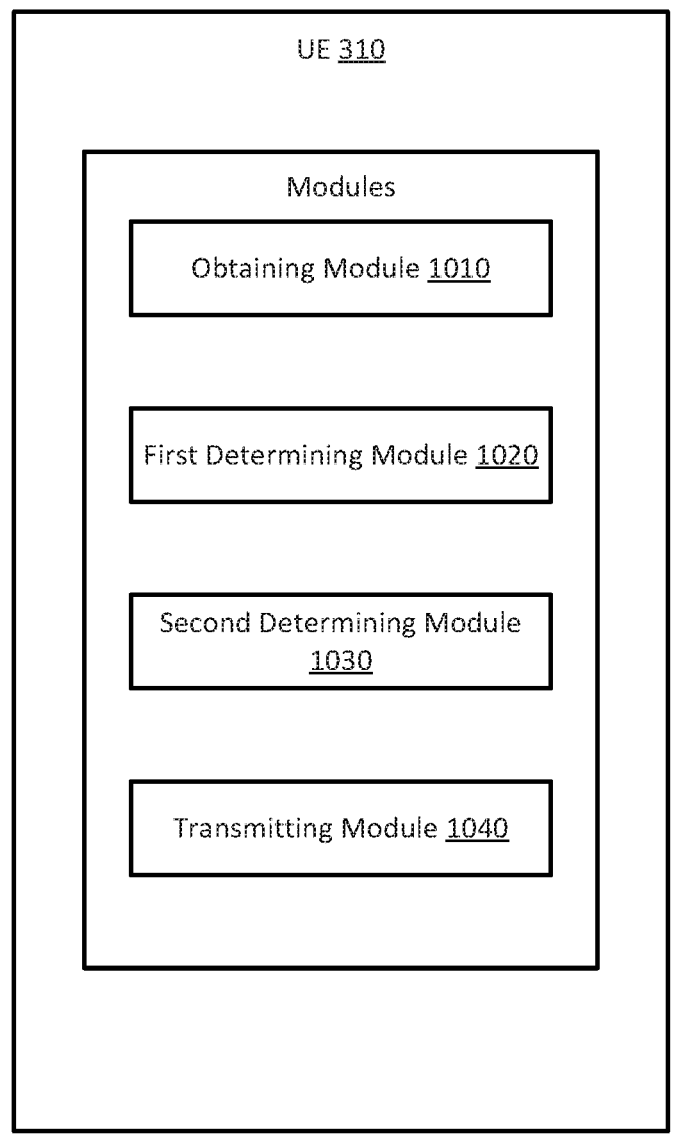
FIG. 7 illustrates a schematic diagram of a wireless device according to another embodiment.

FIG. 7 illustrates an example of the UE 310 in accordance with certain embodiments. The UE 310 may include an obtaining module 1010, a first determining module 1020, a second determining module 1030 and a transmitting module 1040.

In certain embodiments, the obtaining module 1010 may perform steps such as Step 260 in FIG. 3 and step 410 in FIG. 9.

In certain embodiments, the first determining 1020 may perform steps such as Step 270 in FIG. 3 and step 420 in FIG. 9.

In certain embodiments, the second determining module 1030 may perform steps such as Step 280 in FIG. 3 and step 430 in FIG. 9.

In certain embodiments, the transmitting module 1040 may perform steps such as Step 290 in FIG. 3 and step 440 in FIG. 9.

In certain embodiments, the obtaining module 1010, first determining module 1020, second determining module 1030 and the transmitting module 1040 may be implemented using one or more processors, such as those described with respect to FIG. 4. The modules may be integrated or separated in any manner suitable for performing the described functionality.

It should be noted that according to some embodiments, virtualized implementations of the network node 320 of FIGS. 5 and 6 or wireless device 310 of FIGS. 4 and 7 are possible. As used herein, a "virtualized" network node (e.g., a virtualized base station or a virtualized radio access node) is an implementation of the network node in which at least a portion of the functionality of the network is implemented as a virtual component (e.g., via a virtual machine(s) executing on a physical processing node(s) in a network(s)). The functions of the wireless device 310 and network node 320 (described hereinabove) are implemented at the one or more processors 710 and 840 respectively or distributed across a cloud computing system. In some particular embodiments, some or all of the functions of the wireless device 310 and network node 320 (described herein) are implemented as virtual components executed by one or more virtual machines implemented in a virtual environment(s) hosted by processing node(s).

Figure 8:
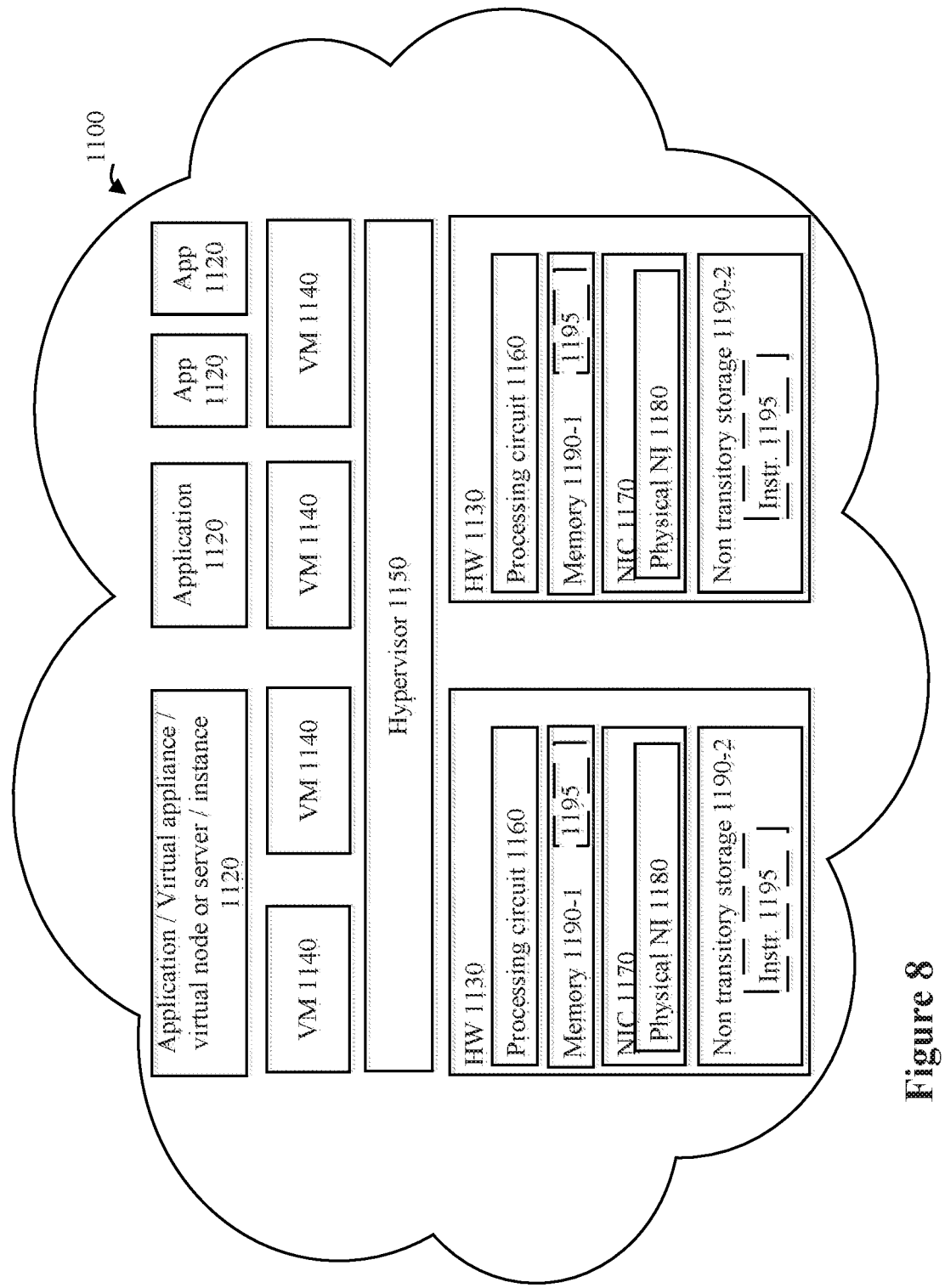
FIG. 8 illustrates a cloud computing environment for performing the methods of FIGS. 2 and 3.

For example, turning to FIG. 8, there is provided an instance or a virtual appliance 1120 implementing the methods or parts of the methods of some embodiments. The instance runs in a cloud computing environment 1100 which provides processing circuit 1160 and memory 1190. The memory contains instructions 1195 executable by the processing circuit 1160 whereby the instance 1120 is operative to execute the methods or part of the methods previously described in relation to some embodiments.

The comprises a general-purpose network device including hardware 1130 comprising a set of one or more processor(s) or processing circuits 1160, which may be commercial off-the-shelf (COTS) processors, dedicated Application Specific Integrated Circuits (ASICs), or any other type of processing circuit including digital or analog hardware components or special purpose processors, and network interface controller(s) 1170 (NICs), also known as network interface cards, which include physical Network Interface 1180. The general-purpose network device also includes non-transitory machine readable storage media 1190-2 having stored therein software and/or instructions 1195 executable by the processor 1160. During operation, the processor(s) 1160 execute the software/instructions 1195 to instantiate a hypervisor 1150, sometimes referred to as a virtual machine monitor (VMM), and one or more virtual machines 1140 that are run by the hypervisor 1150.

A virtual machine 1140 is a software implementation of a physical machine that runs programs as if they were executing on a physical, non-virtualized machine; and applications generally do not know they are running on a virtual machine as opposed to running on a "bare metal" host electronic device, though some systems provide para-virtualization which allows an operating system or application to be aware of the presence of virtualization for optimization purposes. Each of the virtual machines 1140, and that part of the hardware 1130 that executes that virtual machine, be it hardware dedicated to that virtual machine and/or time slices of hardware temporally shared by that virtual machine with others of the virtual machine(s) 1140, forms a separate virtual network element(s) (VNE).

The hypervisor 1150 may present a virtual operating platform that appears like networking hardware to virtual machine 1140, and the virtual machine 1140 may be used to implement functionality such as control communication and configuration module(s) and forwarding table(s), this virtualization of the hardware is sometimes referred to as network function virtualization (NFV). Thus, NFV may be used to consolidate many network equipment types onto industry standard high volume server hardware, physical switches, and physical storage, which can be located in Data centers, and customer premise equipment (CPE). Different embodiments of the instance or virtual appliance 1120 may be implemented on one or more of the virtual machine(s) 1140, and the implementations may be made differently.

Exemplary Standardization Embodiment

In some embodiments, the following sections of 3GPP TS 36.133 v14.2.0 or future versions may be modified as follows to enable one or more of the described embodiments.

6.6 Random Access for UE Category NB1

6.6.1 Introduction

The random access procedure is used when establishing the layer 1 communication between the UE and NB-IoT. The random access is specified in clause 6 of TS 36.213[3] and the control of the RACH transmission is specified in clause 5.1 of TS 36.321[17]. Only contention-based random access is supported for NB-IoT. The requirements in this section are applicable for the random access transmission to an anchor carrier as well as the random access transmission to non-anchor carrier.

6.6.2 Requirements

The UE shall have capability to calculate NPRACH transmission power according to the NPRACH power formula defined in TS 36.213[3] and apply this power level at the first preamble or additional preambles. The absolute power applied to the first preamble shall have an accuracy as specified in TS 36.101[5]. The relative power applied to additional preambles shall have an accuracy as specified in 36.101[5].

The UE shall indicate a Random Access problem to upper layers if the maximum number of preamble transmission counter has been reached for the random access procedure on target cell as specified in clause 5.1.4 in TS 36.321 [17].

6.6.3 Requirements for NPRACH Configuration

In addition to the requirements defined in 6.6.2, UE shall also execute the random access procedure defined in clause 5.1 in TS 36.321 [17] using the NPRACH configuration contained in NPRACH-ConfigSIB-NB in TS 36.331 [2]. The UE shall apply the following procedure:

Determines the enhanced coverage level based on:
the NRSRP intra-frequency measurement for NPRACH transmission to the anchor carrier or based on the NRSRP inter-frequency measurement for NPRACH transmission to the non-anchor carrier and
the configured criterion as defined in section 5.1.1, TS 36.321 [17],
  Selects NPRACH resources [2] configured for the corresponding enhanced coverage level as determined in the previous step and;
  Transmits or re-transmits NPRACH preamble using the selected NPRACH resources and NPRACH configuration.
======<<<<<<TS 36.133>>>>>>======

Any steps or features described herein are merely illustrative of certain embodiments. It is not required that all embodiments incorporate all the steps or features disclosed nor that the steps be performed in the exact order depicted or described herein. Furthermore, some embodiments may include steps or features not illustrated or described herein, including steps inherent to one or more of the steps disclosed herein.

Any two or more embodiments described in this document may be combined in any way with each other. Furthermore, the described embodiments are not limited to the described radio access technologies (e.g., LTE, NR). That is, the described embodiments can be adapted to other radio access technologies.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order. Generally, all terms used in the claims are to be interpreted according to their ordinary meaning in the technical field, unless explicitly defined otherwise herein. All references to "a/an/the element, apparatus, component, means, step, etc." are to be interpreted openly as referring to at least one instance of the element, apparatus, component, means, step, etc., unless explicitly stated otherwise. The steps of any method disclosed herein do not have to be performed in the exact order disclosed, unless explicitly stated.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure.

Some of the abbreviations used in this disclosure include:
ACK Acknowledged
ADC Analog-to-digital conversion
AGC automatic gain control
ANR automatic neighbour relations
AP access point
ARFCN absolute radio frequency channel number
ARQ Automatic Repeat Request
AWGN Additive White Gaussian Noise
BLER block error rate
BS base station
BSC base station controller
CPICH Ec/No CPICH Received energy per chip divided by the power density in the band
CQI Channel Quality information
C-RNTI Cell RNTI
CSG closed subscriber group
CSI Channel State Information
DL Downlink
DL-SCH downlink shared channel
DRX Discontinuous Reception
DTX Discontinuous Transmission
DTCH Dedicated Traffic Channel
DUT Device Under Test
EARFCN evolved absolute radio frequency channel number
E-CID Enhanced Cell-ID (positioning method)
ECGI Evolved CGI
eNB E-UTRAN NodeB
ePDCCH enhanced Physical Downlink Control Channel
E-SMLC evolved Serving Mobile Location Center
E-UTRA Evolved UTRA
E-UTRAN Evolved UTRAN
FDD Frequency Division Duplex
FFT Fast Fourier Transform
GERAN GSM EDGE Radio Access Network
GSM Global System for Mobile communication
HARQ Hybrid Automatic Repeat Request
LPP LTE Positioning Protocol
LTE Long Term Evolution
M2M machine to machine
MAC Medium Access Control
MBMS Multimedia Broadcast Multicast Services
MBSFN Multimedia Broadcast multicast service Single Frequency Network
MBSFN ABS MBSFN Almost Blank Subframe
MCG Master cell group
MDT minimization of drive tests
MeNB Master eNB
MIB Master Information Block
MME Mobility Management Entity
MRTD Maximum Receive timing difference
MSC Mobile Switching Center
MSR Multi-standard radio
NACK Not Acknowledged
NPBCH Narrowband Physical Broadcast CHannel
NPDCCH Narrowband Physical Downlink Control Channel
NPDSCH Narrowband Physical Downlink Shared Channel
NPRACH Narrowband Physical Random Access Channel
NR New Radio
NRS Narrowband Reference signal
OCNG OFDMA Channel Noise Generator
OFDM Orthogonal Frequency Division Multiplexing
OFDMA Orthogonal Frequency Division Multiple Access
OSS Operations Support System
O&M Operation and Maintenance
PBCH Physical Broadcast Channel
PCC Primary Component Carrier
P-CCPCH Primary Common Control Physical ChannelP-Cell Primary Cell
PCFICH Physical Control Format Indicator Channel
PCG Primary cell group
PCH Paging Channel
PCI physical cell identity
PDCCH Physical Downlink Control CHannel
PDSCH Physical Downlink Shared Channel
PDU Protocol data unit
PGW Packet Gateway
PHICH Physical Hybrid-ARQ Indicator CHannel
PRACH Physical Random Access CHannel
PRS Positioning Reference Signal
PSC Primary serving cell
PScell Primary cell
PSS Primary Synchronization signal
PUCCH Physical Uplink Control CHannel
PUSCH Physical Uplink Shared Channel
QAM Quadrature Amplitude Modulation
RACH Random Access Channel
RAT Radio access technology
RB Resource Block
RF Radio frequency
RLM Radio Link Management
RNC Radio network controller
RNTI Radio Network Temporary Identifier
RRC Radio Resource Control
RRH radio resource head
RRM Radio Resource Management
RRU remote radio unit
RS Reference Signal
RSCP Received Signal Code Power
RSRP Reference Signal Received Power
RSRQ Reference Signal Received Quality
RSSI Received Signal Strength Indicator
RSTD Reference Signal Time Difference
RV Redundancy version
SC-FDMA Single carrier FDMA
SCH Synchronization Channel
SCell Secondary Cell
SCC Secondary component carrier
SDU Service Data Unit
SeNB Secondary eNB
SFN System Frame Number
SGW Serving Gateway
SI System Information
SIB System Information Block
SIB1 System Information Block type 1
SNR Signal Noise Ratio
SON Self Optimized Network
SSC Secondary serving cell
SSS secondary synchronization signal
TDD Time Division Duplex
TTI Transmission Time Interval
Tx transmitter
UARFCN UMTS Absolute radio frequency channel number
UE User Equipment UL Uplink
UMTS Universal Mobile Telecommunication System
USB Universal Serial Bus
UTRA Universal Terrestrial Radio Access
UTRAN Universal Terrestrial Radio Access Network
V2V Vehicle to vehicle
WCDMA Wide CDMA
WLAN Wireless Local Area Network

What is claimed is:

1. A network node comprising a processing circuitry and a network interface connected thereto, the processing circuitry configured to:
   receive from a User Equipment (UE) a random access message on a non-anchor carrier;
   determine a coverage enhancement (CE) level of the UE with respect to the non-anchor carrier, based on the received random access message and based on a first procedure for the non-anchor carrier, the first procedure for the non-anchor carrier being based on a second procedure associated with an anchor carrier; wherein the first procedure for the non-anchor carrier comprises performing inter-frequency measurements, the second procedure associated with the anchor carrier comprises performing intra-frequency measurements and the inter-frequency measurements are derived from the intra-frequency measurements;
   use the determined coverage enhancement level for one or more operational tasks.

2. The network node of claim 1, wherein the processing circuitry is further configured to determine the coverage enhancement level based at least on a number of repetitions used by the UE for sending the random access message to determine the coverage enhancement level.

3. The network node of claim 1, wherein the processing circuitry is further configured to allocate uplink (UL) Transmit (Tx) power above a power threshold to the UE, if the determined CE level is larger than a certain CE threshold, otherwise to allocate the UL Tx power below a power threshold to the UE.

4. The network node of claim 1, wherein the processing circuitry is further configured to determine the coverage enhancement level based at least on a number of repetitions used by the UE for sending the random access message to determine the coverage enhancement level.

5. The network node of claim 1, wherein the processing circuitry is further configured to adapt a UE transmit power.

6. A method in a User Equipment (UE), the method comprising:
   obtaining a request to transmit a random access message on a non-anchor carrier to a network node;
   determining a coverage enhancement (CE) level of the UE with respect to the non-anchor carrier based on a first procedure for the non-anchor carrier, the first procedure for the non-anchor carrier being based on a second procedure associated with an anchor carrier; wherein the first procedure for the non-anchor carrier comprises performing inter-frequency measurements, the second procedure associated with the anchor carrier comprises performing intra-frequency measurements and the inter-frequency measurements are derived from the intra-frequency measurements;
   determining radio resources associated with the determined CE level for transmitting the random access message; and
   transmitting to the network node the random access message on the non-anchor carrier using the determined radio resources.

7. The method of claim 6, wherein determining the CE level further comprises comparing the intra-frequency measurements with a threshold value.

8. The method of claim 6, further comprising determining if the non-anchor carrier and the anchor carrier are within a certain frequency range, upon determining that the non-anchor carrier and the anchor carrier are within the certain frequency range, applying the second procedure associated with the anchor carrier for determining both the CE level for the non-anchor carrier and a CE level for the anchor carrier and upon determining that the non-anchor carrier and the anchor carrier are not within the certain frequency range, applying the first procedure and the second procedure for determining respectively the CE level for the non-anchor carrier and a CE level for the anchor carrier.

9. The method of claim 6, further comprising receiving a request to transmit a random access message on the anchor carrier to the network node.

10. The method of claim 6, further comprising determining if the non-anchor carrier and the anchor carrier are within a certain frequency range.

11. The method of claim 6, further comprising determining if the non-anchor carrier and the anchor carrier belong to a same frequency band.

12. A User Equipment (UE), comprising a processing circuitry and a network interface connected thereto, the processing circuitry configured to:
   obtain a request to transmit a random access message on a non-anchor carrier to a network node;
   determine a coverage enhancement (CE) level of the UE with respect to the non-anchor carrier based on a first procedure for the non-anchor carrier, the first procedure for the non-anchor carrier being based on a second procedure associated with an anchor carrier; wherein the first procedure for the non-anchor carrier comprises performing inter-frequency measurements, the second procedure associated with the anchor carrier comprises performing intra-frequency measurements and the inter-frequency measurements are derived from the intra-frequency measurements;
   determine radio resources associated with the determined CE level for transmitting the random access message; and
   transmit to the network node the random access message on the non-anchor carrier using the determined radio resources.

13. The UE of claim 12, wherein the processing circuitry is configured to compare the intra-frequency measurements with a threshold value.

14. The UE of claim 12, wherein the processing circuitry is configured to determine if the non-anchor carrier and the anchor carrier are within a certain frequency range, and wherein
   upon determining that the non-anchor carrier and the anchor carrier are within the certain frequency range, the processing circuitry is configured to apply the second procedure associated with the anchor carrier for determining both the CE level for the non-anchor carrier and a CE level for the anchor carrier; and
   upon determining that the non-anchor carrier and the anchor carrier are not within the certain frequency range, the processing circuitry is configured to apply the first procedure and the second procedure for determining respectively the CE level for the non-anchor carrier and the CE level for the anchor carrier.

15. The UE of claim 12, wherein the processing circuitry is configured to determine if the non-anchor carrier and the anchor carrier belong to a same frequency band, and wherein
upon determining that the non-anchor carrier and the anchor carrier belong to the same frequency band, the processing circuitry is configured to apply the second procedure associated with the anchor carrier for determining both the CE level for the non-anchor carrier and a CE level for the anchor carrier; and
upon determining that the non-anchor carrier and the anchor carrier do not belong to the same frequency band, the processing circuitry is configured to apply the first procedure and the second procedure for determining respectively the CE level for the non-anchor carrier and the CE level for the anchor carrier.

16. The UE of claim 12, wherein the processing circuitry is configured to determine that the non-anchor carrier and the anchor carrier are below a frequency threshold and to apply the second procedure associated with the anchor carrier for determining both the CE level for the non-anchor carrier and a CE level for the anchor carrier.

17. The UE of claim 12, wherein the processing circuitry is configured to determine that the non-anchor carrier and the anchor carrier are equal or larger than a frequency threshold and to apply the first procedure and the second procedure for determining respectively the CE level for the non-anchor carrier and a CE level for the anchor carrier.

18. The UE of claim 12, wherein the processing circuitry is configured to determine that the non-anchor carrier and the anchor carrier have a same carrier frequency and to apply the second procedure associated with the anchor carrier for determining both the CE level for the non-anchor carrier and a CE level for the anchor carrier.

19. The UE of claim 12, wherein the processing circuitry is configured to determine a lack of radio resources for transmitting the random access message on the anchor carrier and the random access message on the non-anchor carrier and wherein the processing circuitry is configured to perform one of: transmit the random access message on the anchor carrier and abort the random access message on the non-anchor carrier, transmit first the random access message on the anchor carrier and later transmit the random access message on the non-anchor carrier, and transmit first the random access message on the non-anchor carrier and then the random access message on the anchor carrier.

* * * * *